US008913110B2

(12) United States Patent
Hori et al.

(10) Patent No.: US 8,913,110 B2
(45) Date of Patent: Dec. 16, 2014

(54) ENDOSCOPE APPARATUS AND MEASUREMENT METHOD

(75) Inventors: Fumio Hori, Tokyo (JP); Yuusuke Kuwa, Tokyo (JP)

(73) Assignee: Olympus Corporation, Tokyo (JP)

( * ) Notice: Subject to any disclaimer, the term of this patent is extended or adjusted under 35 U.S.C. 154(b) by 457 days.

(21) Appl. No.: 13/022,010

(22) Filed: Feb. 7, 2011

(65) Prior Publication Data

US 2011/0221877 A1 Sep. 15, 2011

(30) Foreign Application Priority Data

Mar. 9, 2010 (JP) ................................ P2010-051917

(51) Int. Cl.
H04N 7/18 (2006.01)

(52) U.S. Cl.
CPC .................................... H04N 7/183 (2013.01)
USPC .......................................................... 348/65

(58) Field of Classification Search
CPC ....................................................... H04N 7/18
USPC .......................................................... 348/65
See application file for complete search history.

(56) References Cited

U.S. PATENT DOCUMENTS

| 6,914,623 | B2 * | 7/2005 | Ogawa | 348/45 |
| 6,937,268 | B2 * | 8/2005 | Ogawa | 348/65 |
| 7,443,488 | B2 * | 10/2008 | Ogawa | 356/3.13 |
| 7,564,626 | B2 * | 7/2009 | Bendall et al. | 359/462 |
| 7,679,041 | B2 * | 3/2010 | Lia | 250/208.1 |
| 7,782,453 | B2 * | 8/2010 | Bendall et al. | 356/241.1 |
| 2002/0191074 | A1 * | 12/2002 | Ogawa | 348/65 |
| 2008/0240491 | A1 * | 10/2008 | Hori | 382/100 |
| 2009/0043161 | A1 * | 2/2009 | Doi | 600/117 |
| 2009/0092278 | A1 * | 4/2009 | Doi et al. | 382/100 |

FOREIGN PATENT DOCUMENTS

| JP | 02-296209 A | 12/1990 |
| JP | 7-281105 A | 10/1995 |
| JP | 2001-167272 A | 6/2001 |
| JP | 2002-345735 A | 12/2002 |
| JP | 2004-049638 A | 2/2004 |
| JP | 2005-204724 A | 8/2005 |
| JP | 2008-136706 A | 6/2006 |

(Continued)

OTHER PUBLICATIONS

Japanese Office Action dated Jan. 7, 2014 (and English translation thereof) in counterpart Japanese Application No. 2010-051917.

*Primary Examiner* — Richard Torrente
*Assistant Examiner* — Irfan Habib
(74) *Attorney, Agent, or Firm* — Holtz, Holtz, Goodman & Chick PC

(57) ABSTRACT

An endoscope apparatus, includes: an imaging unit that captures a subject to acquire an image of the subject; a base point setting section that sets a first base point and a second base point on the image based on an instruction input via an input device; a base line setting section that sets a base line on the image based on the first base point and the second base point; a point setting section that sets at least three points on the image based on the base line; a base plane setting section that sets a base plane in a space based on the at least three points; a distance calculation section that calculates a distance between the base plane and a point corresponding to the first base point; and a display that displays the image.

9 Claims, 21 Drawing Sheets

(56) References Cited

FOREIGN PATENT DOCUMENTS

| | | |
|---|---|---|
| JP | 2006-325741 A | 12/2006 |
| JP | 2008-206956 A | 9/2008 |
| JP | 2008-295512 A | 12/2008 |
| JP | 2009-14711 A | 1/2009 |
| JP | 2009-14914 A | 1/2009 |
| JP | 2009-168499 A | 7/2009 |
| JP | 2009-175692 A | 8/2009 |
| JP | 2009-199089 A | 9/2009 |
| JP | 2009-282379 A | 12/2009 |
| JP | 2010-8394 A | 1/2010 |
| JP | 2010-102113 A | 5/2010 |

\* cited by examiner

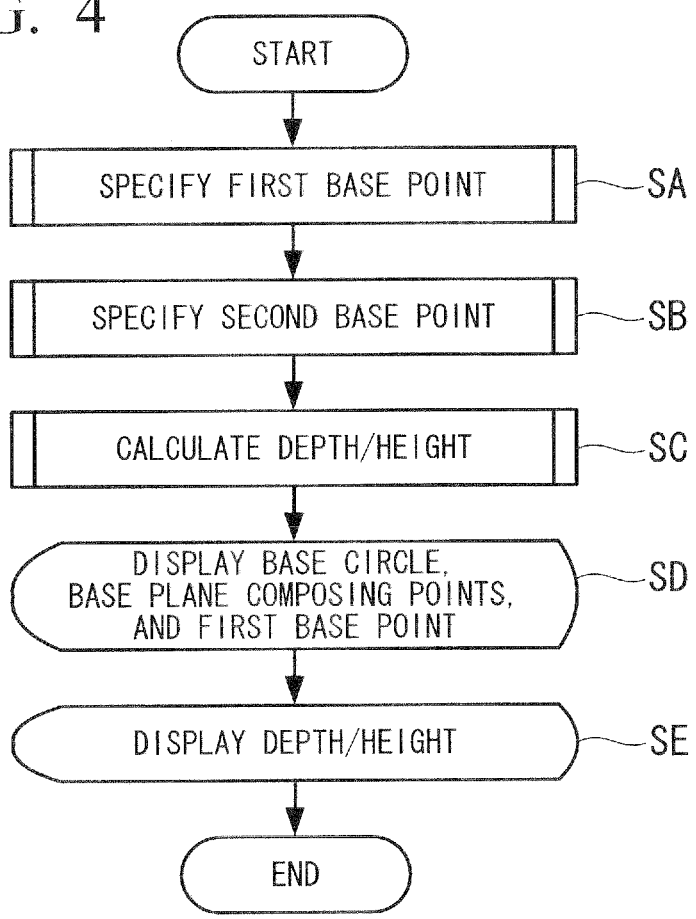

ENDOSCOPE APPARATUS AND MEASUREMENT METHOD

BACKGROUND OF THE INVENTION

1. Field of the Invention

The present invention relates to an endoscope apparatus with a measurement function. Furthermore, the present invention relates to a method of measuring a subject.

Priority is claimed on Japanese Patent Application No. 2010-051917, filed Mar. 9, 2010, the content of which is incorporated herein by reference.

2. Description of Related Art

In gas turbines mainly used in aircraft, their internal portions reach a high temperature. This sometimes results in the production of a defect (burned portion) such as a burn or tarnish on a surface of a turbine blade. The size of the defect is one of the indices for determining whether to replace the blade or not, so the inspection of the defect is extremely important. An endoscope apparatus with a measurement function is used for inspecting blades. In the inspection of blades, the endoscope apparatus measures the defect based on an image where the defect is imaged (hereinafter, referred to as a measurement image) and displays a measurement result. A user checks the measurement result, and determines whether or not the blade needs replacing.

A function of a plane-based measurement is known as one of functions provided in an endoscope apparatus (refer to, for example, Japanese Unexamined Patent Application, First Publication No. H2-296209). In the plane-based measurement, a spatial distance (i.e., three-dimensional distance) between a virtual plane (i.e., base plane) determined by spatial coordinates of three points which are specified on a measurement screen by a user, and spatial coordinates of one point which is specified on the measurement screen by the user. The base plane is a plane at the defect position that approximates a surface of the measurement target when no defect exists. By performing the plane-based measurement, it is possible to obtain the depth of a concave portion, the height of a convex portion, or the like which exists on the surface of a measurement target.

SUMMARY OF THE INVENTION

An endoscope apparatus according to an aspect of the present invention includes: an imaging unit that captures a subject to acquire an image of the subject; a base point setting section that sets a first base point and a second base point on the image based on an instruction input via an input device; a base line setting section that sets a base line on the image based on the first base point and the second base point; a point setting section that sets at least three points on the image based on the base line; a base plane setting section that sets a base plane in a space based on the at least three points; a distance calculation section that calculates a distance between the base plane and a point corresponding to the first base point; and a display that displays the image.

BRIEF DESCRIPTION OF THE DRAWINGS

FIG. 4 is a flow chart showing a procedure of measurement according to the first embodiment of the present invention.

DETAILED DESCRIPTION OF THE INVENTION

Hereunder is a description of embodiments of the present invention with reference to the drawings. Hereunder is a description of a measurement function of a defect for the case where a burned portion of a turbine blade is a measurement target, by way of example.

First Embodiment

Figure 1:
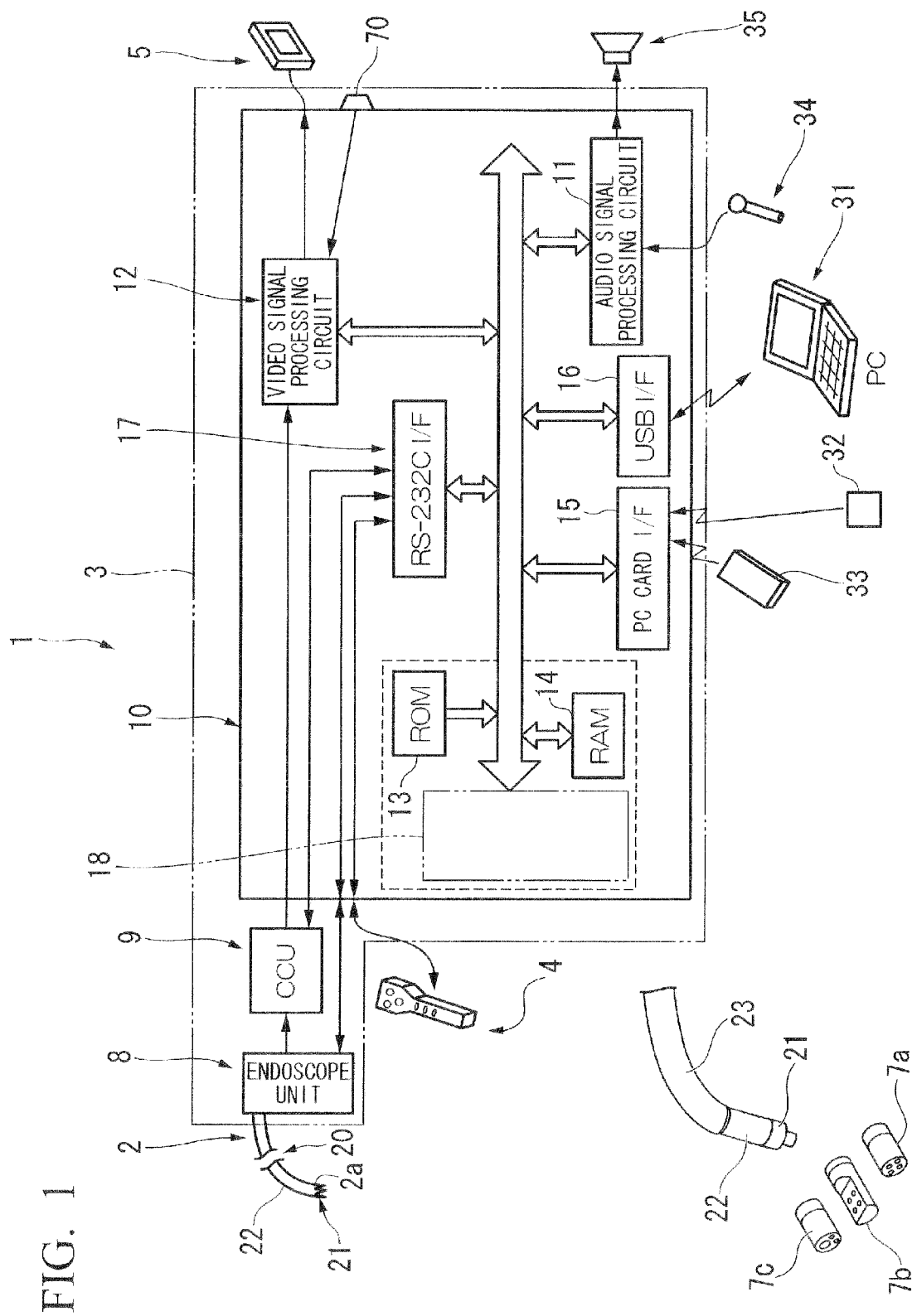
FIG. 1 is a block diagram showing a configuration of an endoscope apparatus according to a first embodiment of the present invention.

First, a first embodiment of the present invention will be described. FIG. 1 shows a configuration of an endoscope apparatus according to the present embodiment. As shown in FIG. 1, an endoscope apparatus 1 includes: an endoscope 2; a main unit 3; a remote control 4 (input device); a liquid crystal monitor 5; optical adapters 7a, 7b, and 7c; an endoscope unit 8; a camera control unit 9; and a control unit 10.

The endoscope 2 (videoscope), which captures an image of a measurement target to generate its image signal, includes a long and thin insertion portion 20. The insertion portion 20 includes: a rigid distal portion 21; a bent portion 22 capable of being bent, for example, in the vertical and horizontal directions; and a flexible tube portion 23, which are coupled in this order from the distal side. The proximal portion of the insertion portion 20 is connected to the endoscope unit 8. Various optical adapters, such as the optical adapter 7a or 7b for stereo having two observation fields of view (hereinafter, referred to as stereo optical adapter) or the normal observation optical adapter 7c having only one observation field of view, can be attached to the distal portion 21 in a freely detachably manner by, for example, threading.

The main unit 3 includes the endoscope unit 8; the camera control unit (hereinafter, referred to as CCU) 9 as an image processing device; and the control unit 10 as a control device. The endoscope unit 8 includes: a light source apparatus for supplying necessary illumination light at the time of observation; and a bending apparatus for bending the bent portion 22 that constitutes the insertion portion 20. The CCU 9 receives an image signal output from a solid-state imaging device 2a built in the distal portion 21 of the insertion portion 20, converts the image signal into a video signal such as an NTSC signal, and supplies it to the control unit 10. The solid-state imaging device 2a generates an image signal by performing photoelectric conversion on a subject image that has been formed through the optical adapter.

The control unit 10 includes: an audio signal processing circuit 11; a video signal processing circuit 12; a ROM 13; a RAM 14; a PC card interface (hereinafter, referred to as PC card I/F) 15; a USB interface (hereinafter, referred to as USB I/F) 16; an RS-232C interface (hereinafter, referred to as RS-232C I/F) 17; and a measurement processing portion 18.

An audio signal generated by collecting sound with the microphone 34 or an audio signal obtained by playing a recording medium such as a memory card is supplied to the audio signal processing circuit 11. To display a synthesized image obtained by synthesizing the endoscope image supplied from the CCU 9 with a graphical operation menu, the video signal processing circuit 12 performs processing of synthesizing the video signal from the CCU 9 with a graphic image signal such as an operation menu generated through the control by the measurement processing portion 18. In addition, to display a video on the screen of the liquid crystal monitor 5, the video signal processing circuit 12 subjects the video signal after the synthesis to predetermined processing, and supplies it to the liquid crystal monitor 5.

The video signal processing circuit 12 outputs image data, which is based on the video signal from the CCU 9, to the measurement processing portion 18. At the time of measurement, a stereo optical adapter is attached to the distal portion 21, and a plurality of subject images relating to the same subject as a measurement target are included in the image based on the image data from the video signal processing circuit 12. In the present embodiment, a pair of left and right subject images is included, by way of example.

A memory card (recording medium) such as a PCMCIA memory card 32 or a flash memory card 33 is freely attached to or detached from the PC card I/F 15. When the memory card is attached to the PC card I/F 15, control processing information, image information, optical data, or the like that is stored in the memory card can be taken in, or control processing information, image information, optical data, or the like can be stored in memory card, in accordance with the control of the measurement processing portion 18.

The USB I/F 16 is an interface which electrically connects the main unit 3 and a personal computer (PC) 31 to each other. When the main unit 3 and the personal computer 31 are connected to each other through the USB I/F 16, it is possible to perform various kinds of instruction and controls, such as an instruction to display an endoscope image or an image processing during measurement, at the personal computer 31 side. In addition, it is possible to input and output various pieces of processing information, data and the like between the main unit 3 and the personal computer 31.

The RS-232C I/F 17 is connected to the CCU 9, the endoscope unit 8, and the remote control 4 which performs control and operation instructions of the CCU 9, the endoscope unit 8, and the like. When a user operates the remote control 4, a communication required for controlling the CCU 9 and the endoscope unit 8 is performed based on the user's operation of the remote control 4.

Figure 2:
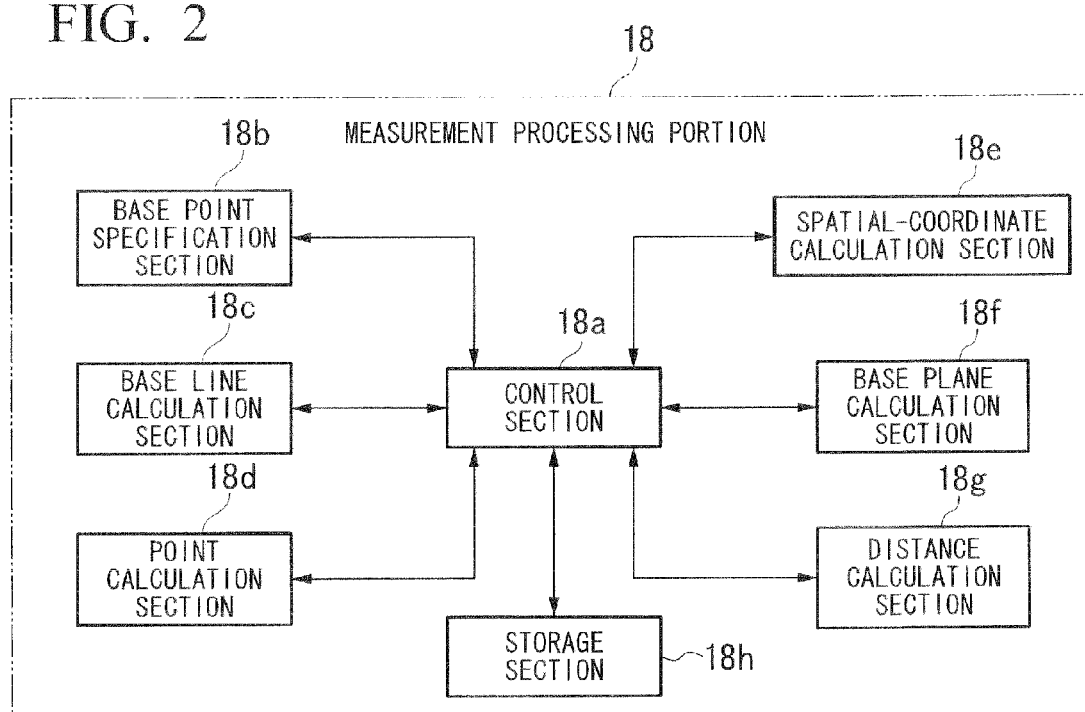
FIG. 2 is a block diagram showing a configuration of a measurement processing portion provided in the endoscope apparatus according to the first embodiment of the present invention.

The measurement processing portion 18 executes a program stored in the ROM 13, to thereby take in the image data from the video signal processing circuit 12 and perform measurement processing based on the image data. The RAM 14 is used by the measurement processing portion 18 as a work area for temporarily storing data. FIG. 2 shows a configuration of the measurement processing portion 18. As shown in FIG. 2, the measurement processing portion 18 includes: a control section 18a; a base point specification section 18b; a base line calculation section 18c; a point calculation section 18d; a spatial-coordinate calculation section 18e; a base plane calculation section 18f; a distance calculation section 18g; and a storage section 18h.

The control section 18a controls the various sections of the measurement processing portion 18. Furthermore, the control section 18a has a function of generating a graphic image signal for displaying the measurement result, the operation menu, and the like on the liquid crystal monitor 5, and of outputting the graphic image signal to the video signal processing circuit 12.

The base point specification section 18b specifies a base point on the measurement target based on a signal input from the remote control 4 or the PC 31 (input portion). When the user inputs a base point while looking at the image of the measurement target displayed on the liquid crystal monitor 5, its coordinates are calculated by the base point specification section 18b. In the following description, it is assumed that the user operates the remote control 4. However, the same applies to the case where the user operates the PC 31. In the present embodiment, two base points are set on the image.

The base line calculation section 18c set a base line whose shape or size is determined based on the two base points specified by the base point specification section 18b, and calculates image coordinates of the base line (or the equation of the base line used to determine its image coordinates). In the present embodiment, a base circle is used as the base line. The base circle is set so as to surround a part of or all of a feature region (a burned portion in the present embodiment).

In the present specification, two-dimensional coordinates on an image displayed on the liquid crystal monitor 5 are described as "image coordinates", and three-dimensional coordinates in the actual space are described as "spatial coordinates". The point calculation section 18d sets three or four base plane composing points that constitute a base plane with reference to the position of the base circle, and calculates their image coordinates. In the present embodiment, the base plane composing points are set on the base circle. The spatial-coordinate calculation section 18e calculates spatial coordinates which correspond to the image coordinates.

The base plane calculation section 18f sets a base plane based on the three or four spatial coordinates which correspond to the base plane composing points, and calculates spatial coordinates of the base plane (or the equation of the base plane used to determine its spatial coordinates). The base plane is a plane, at the defect position, which approximates a surface of the measurement target in the case in which no defect exists. The distance calculation section 18g calculates a spatial distance between the base plane and a point in the space corresponding to one of the two base points specified by the base point specification section 18b. This spatial distance corresponds to the depth of a concave portion or the height of a convex portion (the depth of the burned portion in the present embodiment) which exists on the surface of the measurement target. The storage section 18h stores various pieces of information that are processed in the measurement processing portion 18. The various pieces of information stored in the storage section 18h are appropriately read by the control section 18a and are then output to the appropriate sections.

Figure 22:
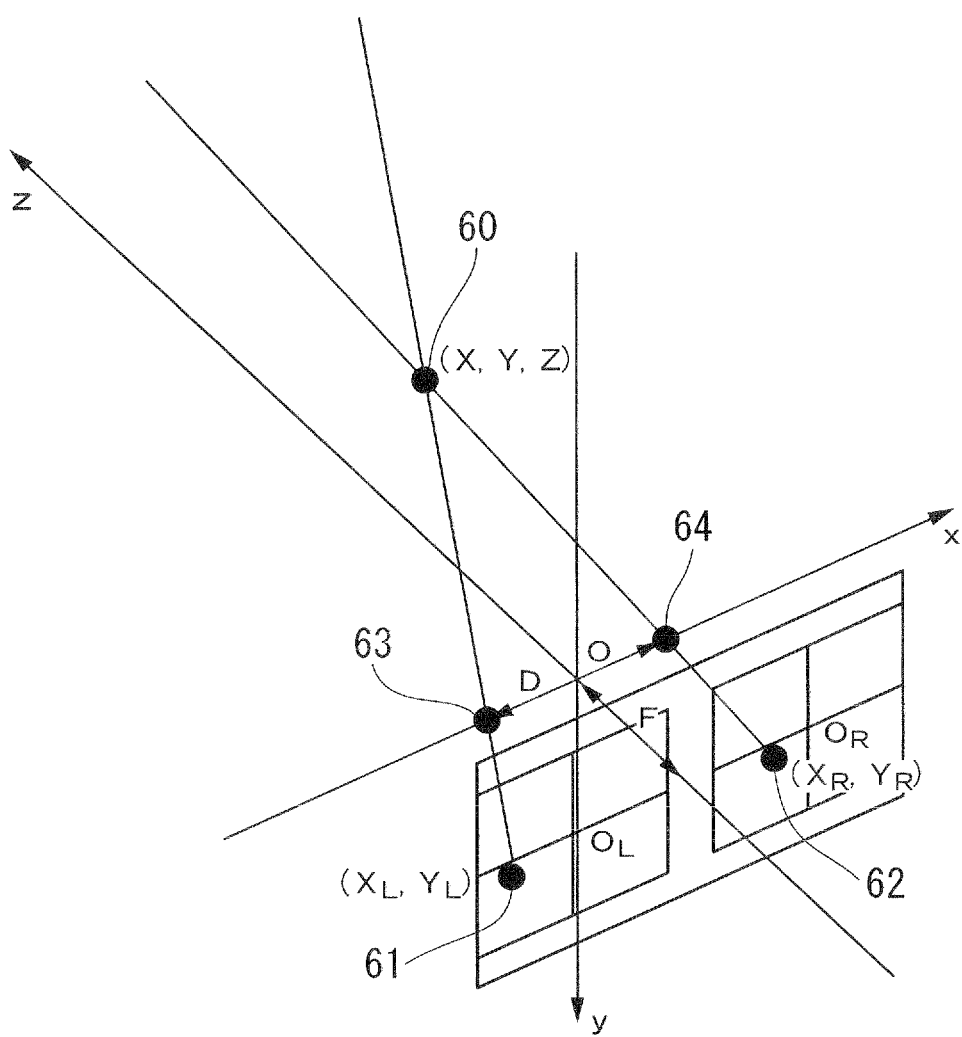
FIG. 22 is a reference diagram for explaining a method of finding three-dimensional coordinates of a measurement point using the stereo measurement.

Next, the way of calculating three-dimensional coordinates of a measurement point by the stereo measurement will be described with reference to FIG. 22. For images that are imaged by the left side and right side optical systems, three-dimensional coordinates (X, Y, Z) of a measurement target point 60 are calculated by the triangulation method using the following Equations (a) to (c). Note that it is assumed that the coordinates of a measurement point 61 and a corresponding point 62 (a point on the right image that corresponds to the measurement point 61 on the left image) on the left and right images that have been subjected to distortion correction are $(X_L, Y_L)$ and $(X_R, Y_R)$, respectively, the distance between optical centers 63 and 64 on the left side and the right side is D, the focal length is F, and $t=D/(X_L-X_R)$.

$$X = t \times X_R + D/2 \quad (a)$$

$$Y = t \times Y_R \quad (b)$$

$$Z = t \times F \quad (c)$$

When the coordinates of the measurement point 61 and the corresponding point 62 on are determined in the aforementioned manner, the three-dimensional coordinates of the measurement target point 60 are found using the parameters D and F. By calculating the three-dimensional coordinates of a number of points, various measurements such as a point-to-point distance, the distance between a line connecting two points and one point, surface area, depth, and surface shape, are possible. Furthermore, it is possible to calculate the distance (object distance) from the left-side optical center 63 or the right-side optical center 64 to the subject. In order to carry out the aforementioned stereo measurement, optical data that shows the characteristics of the optical system including the distal portion 21 and the stereo optical adaptor are required. Note that the details of the optical data are disclosed, for example, in Japanese Unexamined Patent Application, First Publication No. 2004-49638, so an explanation thereof will be omitted here.

Next is a description of a measurement screen in the present embodiment. In the present embodiment, measurement of a defect is performed by using the stereo measurement. In the stereo measurement, a measurement target is imaged in a state with the stereo optical adapter attached to the distal portion 21 of the endoscope 2. Therefore, a pair of left and right images of the measurement target is displayed on the measurement screen. Note that measurement of a defect may be performed by using a measurement method other than the stereo measurement.

Figure 3:
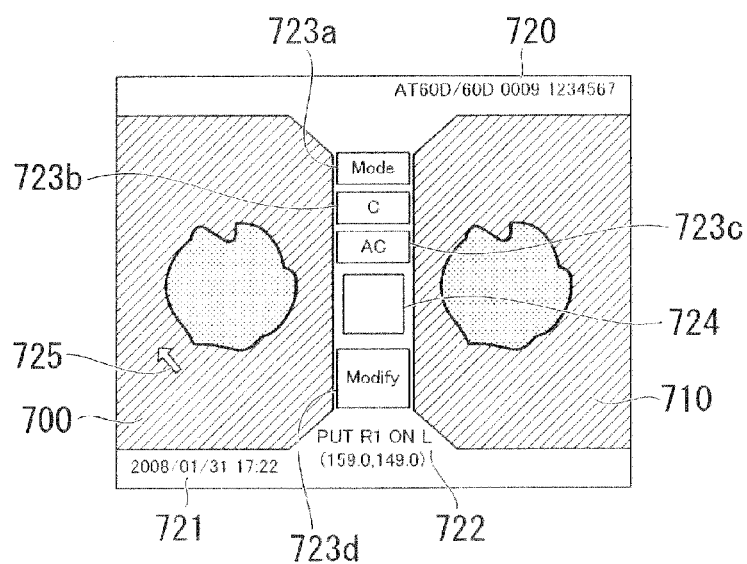
FIG. 3 is a reference diagram showing a measurement screen according to the first embodiment of the present invention.

FIG. 3 shows a measurement screen before the start of measurement. As measurement information, a left image of the measurement target is displayed on a left screen 700, and a right image of the measurement target is displayed on a right screen 710. Optical adapter name information 720, time information 721, message information 722, icons 723a, 723b, 723c, and 723d, and a zoom window 724 are displayed on the measurement screen in a region outside the left screen 700 and the right screen 710, as other pieces of measurement information.

The optical adapter name information 720 and the time information 721 are pieces of information showing measurement conditions. The optical adapter name information 720 is textual information showing the name of the optical adapter in current use. The time information 721 is textual information showing the current date and time. The message information 722 includes: textual information showing an operational instruction for the user; and textual information showing coordinates of a base point, which is one of the measurement conditions.

The icons 723a to 723d constitute an operation menu for the user to input operational instructions such as switching measurement modes and clearing a measurement result. When the user operates the remote control 4 to move a cursor 725 onto any of the icons 723a to 723d and performs an operation such as a click in this state, a signal corresponding to the operation is input to the measurement processing portion 18. Based on the signal, the control section 18a recognizes the operational instruction from the user, and controls the measurement processing. In addition, an enlarged image of the measurement target located around the cursor 725 is displayed on the zoom window 724.

Figure 5A:
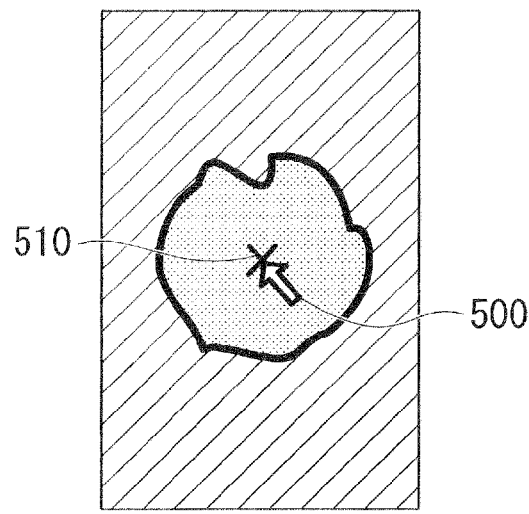
FIGS. 5A to 5D are reference diagrams showing a state in which a first base point and a second base point are specified according to the first embodiment of the present invention.

Next, a procedure of measurement in the present embodiment will be described. FIG. 4 shows a procedure of measurement. In Step SA, the user operates the remote control 4 to specify a first base point on the measurement screen displayed on the liquid crystal monitor 5. As shown in FIG. 5A, the user moves a cursor 500 displayed on the left screen of the measurement screen and performs an operation such as a click to specify a first base point 510. The first base point becomes the center position of a base circle, and the depth of a concave portion or the height of a convex portion is measured at the first base point. It is preferable for the user to specify the first base point at a point located nearly in the center of the inside of the burned portion. In Step SA, when the user inputs an instruction of specifying the first base point, the base point specification section 18b recognizes image coordinates at the current cursor position as image coordinates of the first base point. Details of Step SA will be described later.

Figure 5B:
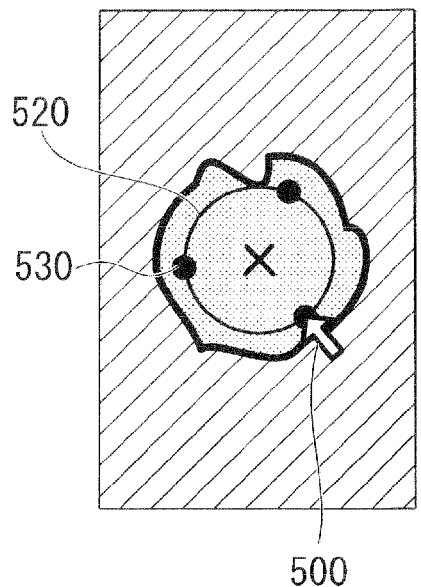

In Step SB, the user operates the remote control 4 to specify a second base point on the measurement screen displayed on the liquid crystal monitor 5. As shown in FIG. 5B, when the user moves the cursor 500, a base circle 520 having a size in accordance with the position of the cursor 500 is displayed, and three base plane composing points 530 are displayed on the base circle 520. At this time, a second base point is temporarily specified at the position of the cursor. The base circle has a diameter twice as long as the distance between the first base point and the second base point. The three base plane composing points are set on the base circle in an evenly spaced manner, and one of the three base plane composing points is at the same position as the cursor.

Figure 5C:
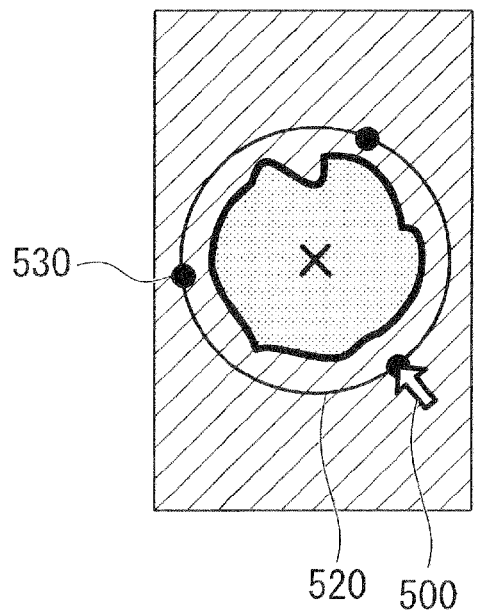
Figure 5D:
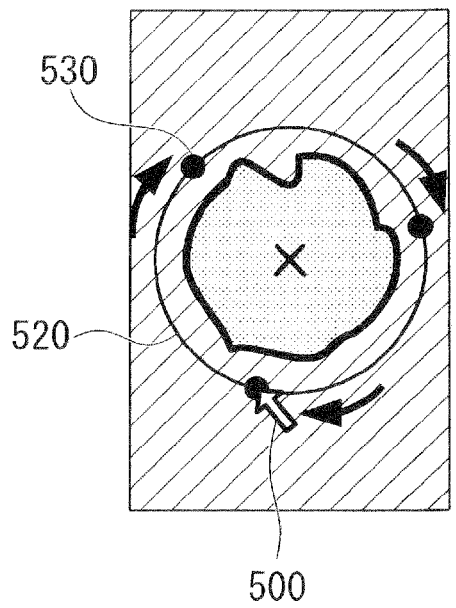

As shown in FIG. 5C, when the user further moves the cursor 500, the position of the temporarily-specified second base point changes in accordance with the movement of the cursor 500, and the base circle 520 and the base plane composing points 530 also change. Then, as shown in FIG. 5D, the user performs an operation such as a click to specify (fix) the second base point in a state where the base circle 520 is located slightly outside the burned portion (i.e., in a state where the base circle 520 nearly surrounds the burned portion). The base circle may be set in a state where the base circle does not completely surround the burned portion. However, it is preferable that all of the base plane composing points are located outside the burned portion in order to enhance the measurement accuracy. In Step SB, when the user inputs an instruction of specifying (fixing) the second base point, the base point specification section 18*b* recognizes image coordinates at the current cursor position as image coordinates of the second base point. Details of Step SB will be described later.

Figure 6A:
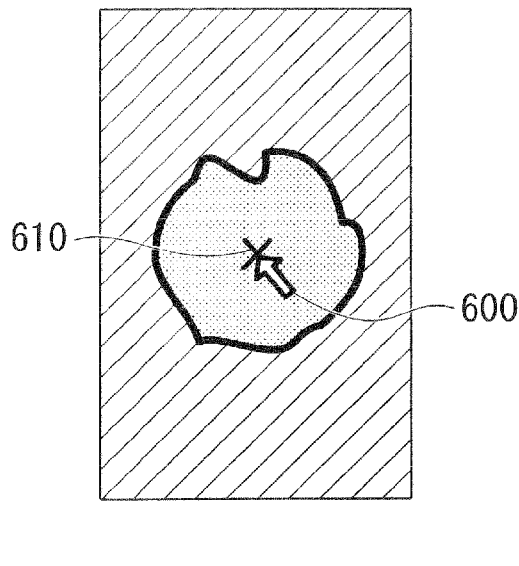
FIGS. 6A to 6D are reference diagrams showing a state in which a first base point and a second base point are specified according to the first embodiment of the present invention.
Figure 6B:
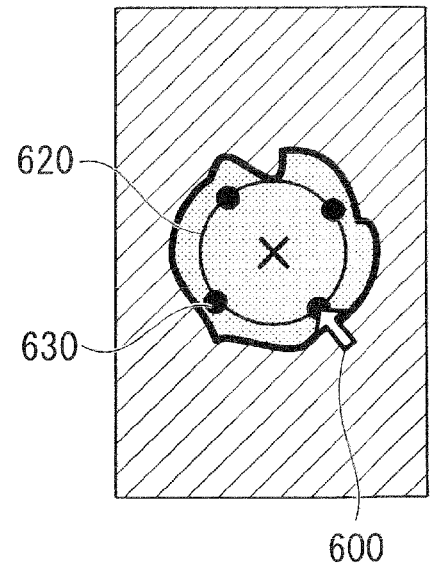

In the example shown in FIGS. 5A to 5D, the number of base plane composing points is three. However, the number of base plane composing points may be four or more. In the case in which the number of base plane composing points is four, as shown in FIG. 6A, the user moves a cursor 600 and performs an operation such as a click to specify a first base point 610. Then, when the user further moves the cursor 600, as shown in FIG. 6B, a base circle 620 is displayed and four base plane composing points 630 are displayed on the base circle 620. At this time, a second base point is temporarily specified at the position of the cursor. The four base plane composing points are set on the base circle in an evenly spaced manner, and one of the four base plane composing points is at the same position as the cursor.

Figure 6C:
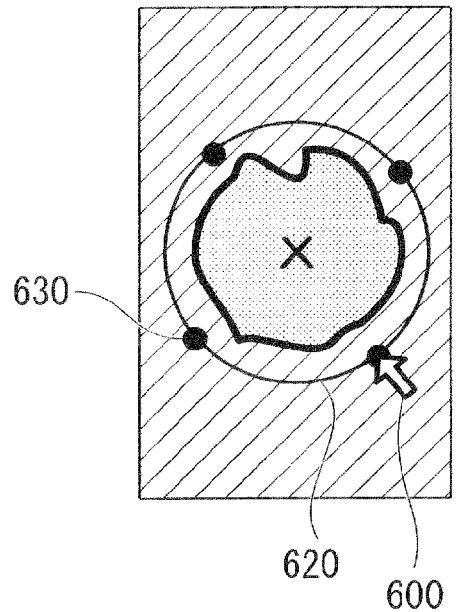
Figure 6D:
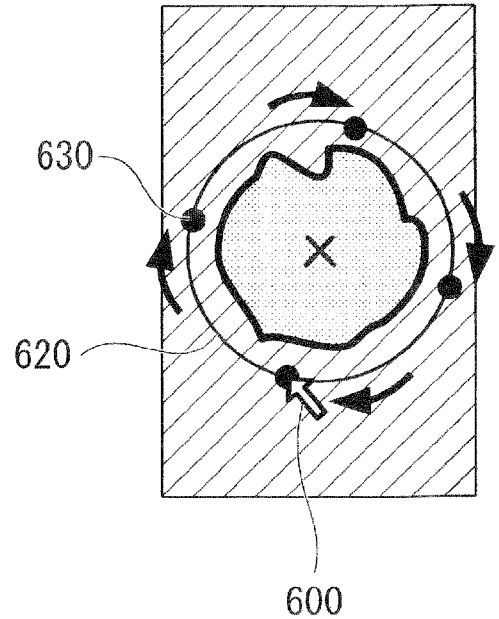

As shown in FIG. 6C, when the user further moves the cursor 600, the position of the temporarily-specified second base point changes in accordance with the movement of the cursor 600, and the base circle 620 and the base plane composing points 630 also change. Then, as shown in FIG. 6D, the user performs an operation such as a click to specify (fix) the second base point in a state where the base circle 620 is located slightly outside the burned portion (i.e., in a state where the base circle 620 nearly surrounds the burned portion).

In Step SC, the base plane composing points and the base plane are calculated, and a spatial distance (depth or height: the depth of the burned portion in the present embodiment) between the base plane and a point in the space corresponding to the first base point are calculated. Details of Step SC will be described later.

In Step SD, the control section 18*a* generates a graphic image signal for displaying the base circle, the base plane composing points, and the first base point, and outputs it to the video signal processing circuit 12. As a result, the base circle, the base plane composing points, and the first base point are displayed on the left screen. In Step SE, the control section 18*a* generates a graphic image signal for displaying the spatial distance between the base plane and the point in the space corresponding to the first base point, and outputs it to the video signal processing circuit 12. As a result, the spatial distance is displayed on the left screen.

Figure 7A:
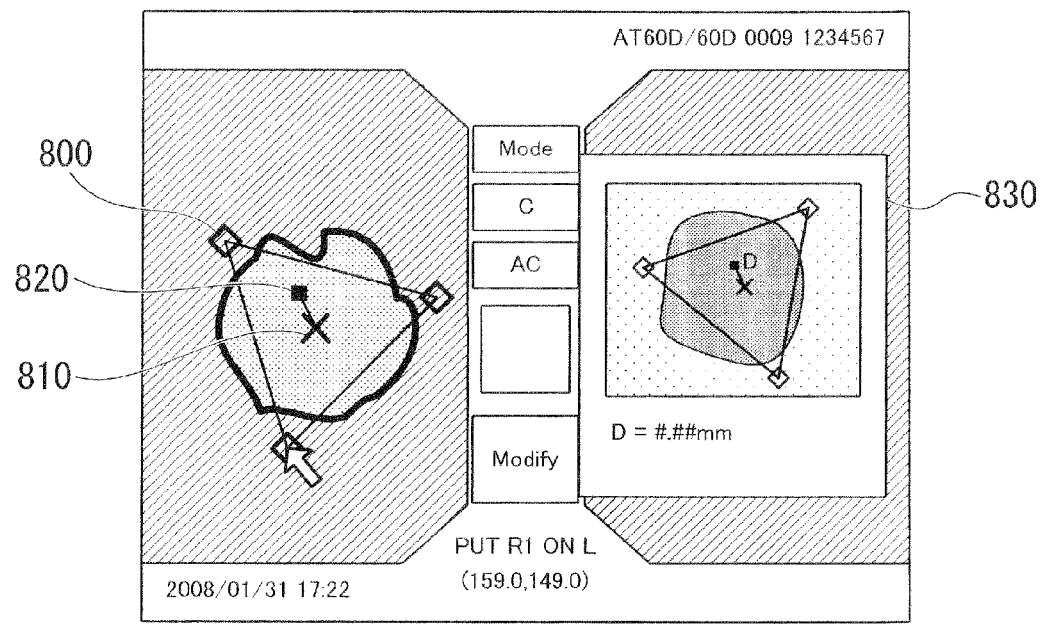
FIGS. 7A and 7B are reference diagrams showing a measurement screen according to the first embodiment of the present invention.
Figure 7B:
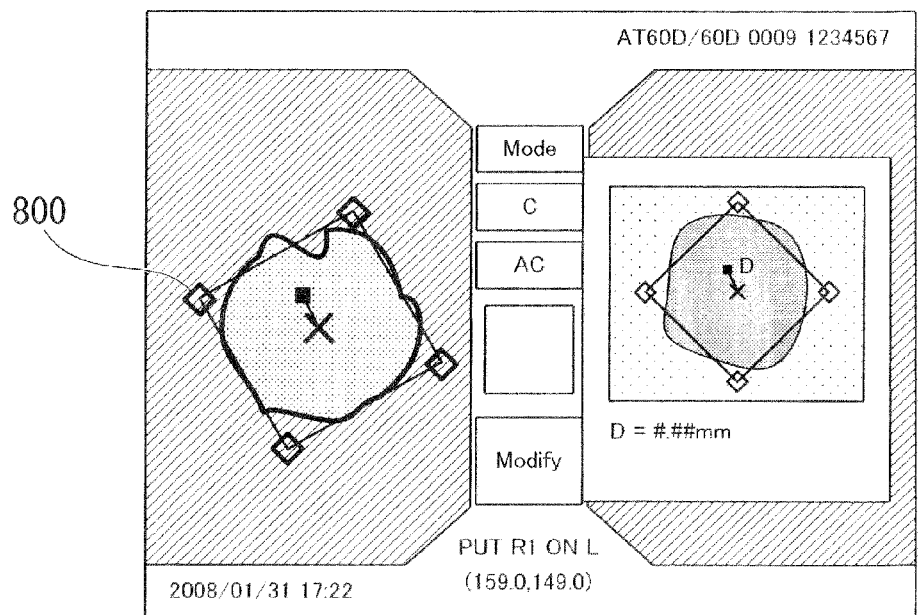

FIGS. 7A and 7B show measurement screens when the measurement result of the burned portion is displayed. FIG. 7A shows a measurement screen in the case in which the number of base plane composing points is three. Base plane composing points 800 and a first base point 810 are displayed on the left screen. Specifically, the base plane composing points 800 are displayed as unfilled diamond marks, and they are connected with each other. The first base point 810 is displayed as an "x" mark. Further, an intersection point 820 (i.e., foot of a perpendicular) between the base plane and a line which is perpendicular to the base plane and passes through the point in the space corresponding to the first base point 810 is displayed as a small filled square.

A result window 830 is displayed on the right screen. The image of the measurement target is displayed in the upper portion of the result window 830, and the spatial distance in text is displayed in the lower portion of the result window 830. D denotes the spatial distance (i.e., the depth of the burned portion). FIG. 7B shows a measurement screen in the case in which the number of base plane composing points is four. FIG. 7B is similar to FIG. 7A except that four base plane composing points 800 are displayed.

Figure 8:
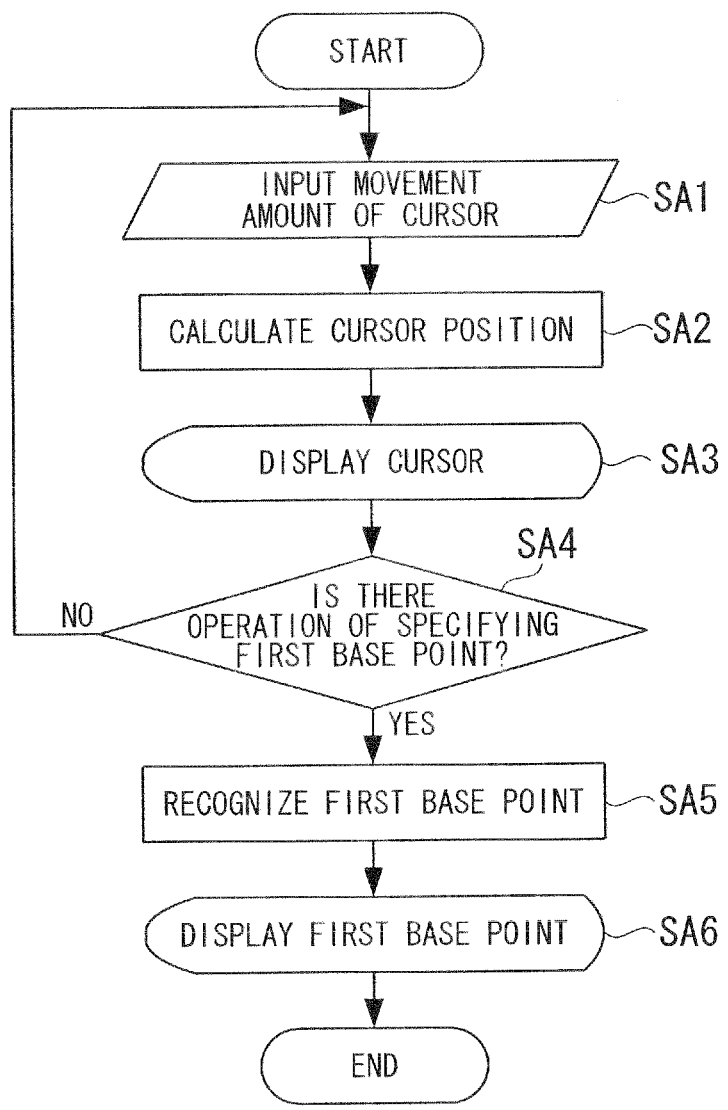
FIG. 8 is a flow chart showing a procedure of measurement according to the first embodiment of the present invention.

Next, a procedure of Step SA (i.e., processing of specifying a first base point) will be described. FIG. 8 shows a procedure of Step SA. At the start time of Step SA, a measurement screen is displayed and a cursor is displayed on the measurement screen. In Step SA1, a signal indicating a movement amount of the cursor by the user's operation of the remote control 4 is input into the measurement processing portion 18. In Step SA2, the base point specification section 18*b* calculates image coordinates of the cursor at the next time by calculating the movement amount of the cursor based on the signal from the remote control 4, and adding the calculated movement amount to the position of the cursor at the current time.

In Step SA3, the control section 18*a* generates a graphic image signal for displaying the cursor at the image coordinates calculated by the base point specification section 18*b*, and outputs it to the video signal processing circuit 12. As a result, the cursor is displayed at the position the user specifies.

In Step SA4, the control section 18*a* determines, based on the signal from the remote control 4, whether or not an operation, such as a click, of specifying a first base point has been input. When an operation of specifying a first base point has not been input, the processing returns to Step SA1. When an operation of specifying a first base point has been input, the processing proceeds to Step SA5, and the base point specification section 18*b* recognizes the image coordinates calculated in Step SA2 as image coordinates of the first base point. As a result, the first base point is fixed.

In Step SA6, the control section 18*a* generates a graphic image signal for displaying the first base point at the above image coordinates, and outputs it to the video signal processing circuit 12. As a result, the first base point is displayed at the same position as the cursor. Then, the processing proceeds to Step SB.

Figure 9:
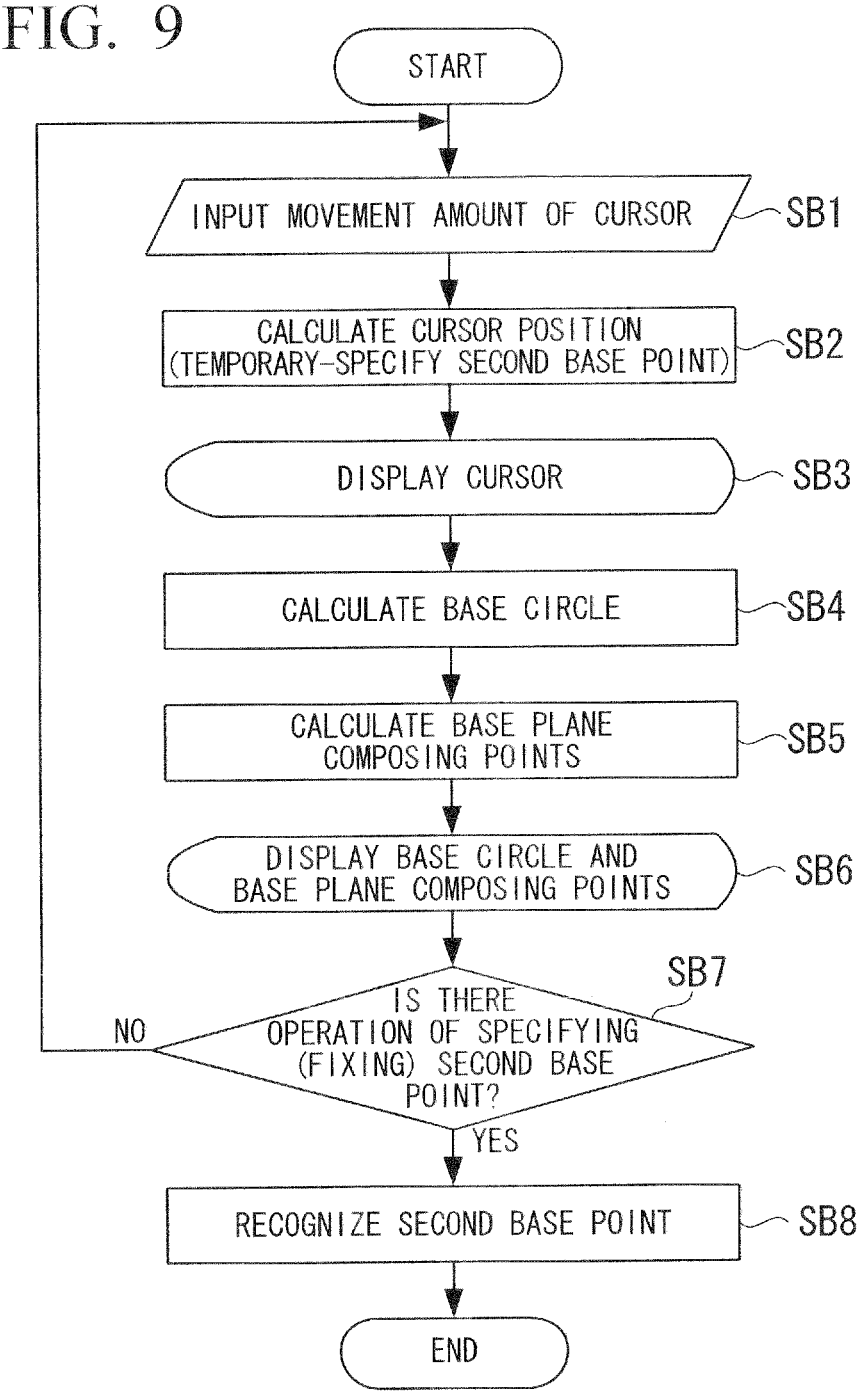
FIG. 9 is a flow chart showing a procedure of measurement according to the first embodiment of the present invention.

Next, a procedure of Step SB (i.e., processing of specifying a second base point) will be described. FIG. 9 shows a procedure of Step SB. In Step SB1, a signal indicating a movement amount of the cursor by the user's operation of the remote control 4 is input into the measurement processing portion 18. In Step SB2, the base point specification section 18*b* calculates image coordinates of the cursor at the next time by calculating the movement amount of the cursor based on the signal from the remote control 4, and adding the calculated movement amount to the position of the cursor at the current time. Further, the base point specification section 18b recognizes the above image coordinates as image coordinates of the second base point which is temporarily specified by the user.

In Step SB3, the control section 18a generates a graphic image signal for displaying the cursor at the image coordinates calculated by the base point specification section 18b, and outputs it to the video signal processing circuit 12. As a result, the cursor is displayed at the position the user specifies. In Step SB4, the base line calculation section 18c calculates image coordinates of the base circle (or the equation of the base circle used to determine its image coordinates) based on the image coordinates of the first base point and the image coordinates of the cursor calculated in Step SB2 (i.e., the image coordinates of the temporarily-specified second base point). The center of the base circle is at the first base point, and the radius of the base circle is equal to the distance between the image coordinates of the first base point and the image coordinates of the cursor.

In Step SB5, the point calculation section 18d calculates image coordinates of three or four base plane composing points that constitute a base plane based on the image coordinates of the base circle. As described above, although the base plane composing points are set on the base circle in an evenly spaced manner in the present embodiment, they may be set unevenly. In Step SB6, the control section 18a generates a graphic image signal for displaying the base circle and the base plane composing points, and outputs it to the video signal processing circuit 12. As a result, the base circle and the base plane composing points are displayed.

In Step SB7, the control section 18a determines, based on the signal from the remote control 4, whether or not an operation, such as a click, of specifying (fixing) a second base point has been input. When an operation of specifying (fixing) a second base point has not been input, the processing returns to Step SB 1. When an operation of specifying (fixing) a second base point has been input, the processing proceeds to Step SB8, and the base point specification section 18b recognizes the image coordinates calculated in Step SB2 as image coordinates of the fixed second base point. Then, the processing proceeds to Step SC.

Figure 10:
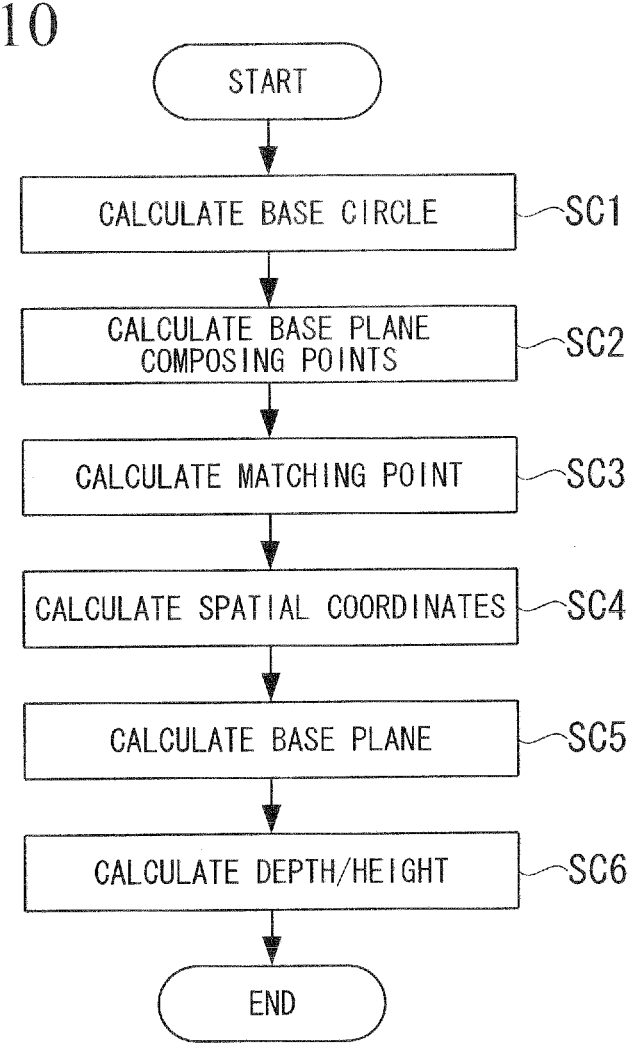
FIG. 10 is a flow chart showing a procedure of measurement according to the first embodiment of the present invention.

Next, a procedure of Step SC (i.e., calculation of the depth or height) will be described. FIG. 10 shows a procedure of Step SC. In Step SC1, the base line calculation section 18c calculates image coordinates of the base circle (or the equation of the base circle used to determine its image coordinates) based on the image coordinates of the first base point and the image coordinates of the second base point. The center of the base circle is at the first base point, and the radius of the base circle is equal to the distance between the image coordinates of the first base point and the image coordinates of the second base point.

In Step SC2, the point calculation section 18d calculates image coordinates of three or four base plane composing points which constitute a base plane based on the image coordinates of the base circle. The base circle and the base plane composing points which were calculated in the previous Steps SB4 and SB5 may be also used in the subsequent processing instead of calculating the base circle and the base plane composing points in Steps SC1 and SC2.

In Step SC3, the point calculation section 18d performs matching processing in which image coordinates of corresponding points (matching points) on the right image which correspond to the image coordinates of the first base point and the base plane composing points on the left image are calculated by pattern-matching. In Step SC4, the spatial-coordinate calculation section 18e calculates spatial coordinates of a point in the space which corresponds to the first base point, based on the image coordinates of the first base point and the image coordinates of its matching point. Further, the spatial-coordinate calculation section 18e calculates spatial coordinates of three or four points in the space which correspond to the base plane composing points, based on the image coordinates of the base plane composing points and the image coordinates of their matching points.

In Step SC5, the base plane calculation section 18f set a base plane based on the spatial coordinates of the three or four points calculated in Step SC4, and calculates spatial coordinates of the base plane (or the equation of the base plane used to determine its spatial coordinates). Details of the calculation method of the base plane will be described later. In Step SC6, the distance calculation section 18g calculates a spatial distance between the base plane and the spatial coordinates of the point in the space corresponding to the first base point. This spatial distance corresponds to the depth of the burned portion in the present embodiment. Details of the calculation method of the spatial distance will be described later. Then, the processing proceeds to Step SD.

Figure 11A:
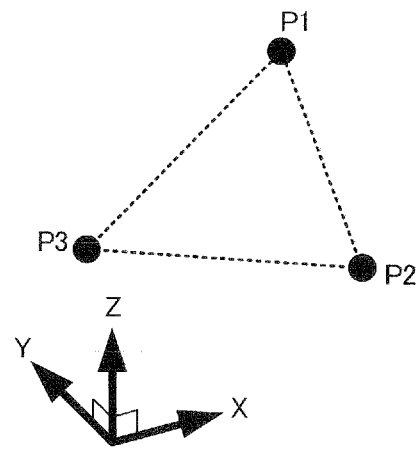
FIGS. 11A and 11B are reference diagrams showing a calculation method of a base plane according to the first embodiment of the present invention.

Next, the calculation method of the base plane will be described. First, details of the calculation method of the base plane in the case in which the number of base plane composing points is three will be described with reference to FIGS. 11A and 11B. As shown in FIG. 11A, it is assumed that spatial points of the three base plane composing points are P1, P2, and P3, respectively, and their spatial coordinates are expressed as follows.

$$P1:(x_1,y_1,z_1)$$

$$P2:(x_2,x_2,z_2)$$

$$P3:(x_3,y_3,z_3)$$

Figure 11B:
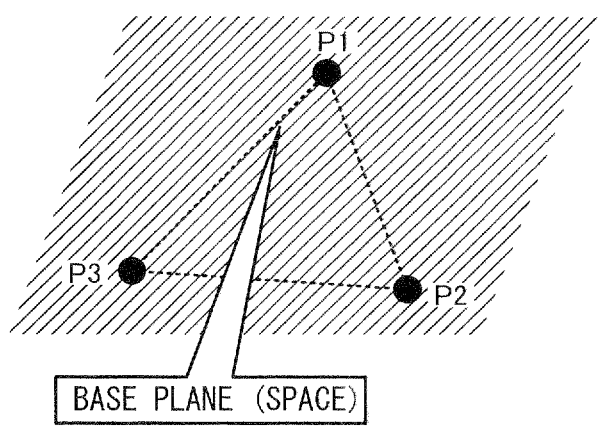

As shown in FIG. 11B, when a plane passing through the points P1 to P3 is defined as a base plane, the equation of the base plane is obtained as follows. The base plane is defined by the following Equation (1).

$$Ax+By+Cz=1 \tag{1}$$

Since the base plane passes through the points P1 to P3, the following Equations (2) to (4) can be obtained.

$$Ax_1+By_1+Cz_1=1 \tag{2}$$

$$AX_2+By_2+Cz_2=1 \tag{3}$$

$$Ax_3+By_3+Cz_3=1 \tag{4}$$

The values of A, B, and C can be calculated using the Equations (2) to (4). By the above-described method, the base plane can be calculated.

Figure 12A:
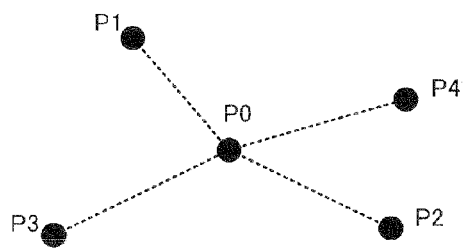
FIGS. 12A to 12D are reference diagrams showing a calculation method of a base plane according to the first embodiment of the present invention.

Next, details of the calculation method of the base plane in the case in which the number of base plane composing points is four will be described with reference to FIGS. 12A to 12D. As shown in FIG. 12A, it is assumed that spatial points of the four base plane composing points are P1, P2, P3, and P4, respectively, and their spatial coordinates are expressed as follows.

$$P1:(x_1,y_1,z_1)$$

$$P2:(x_2,y_2,z_2)$$

$$P3:(x_3,y_3,z_3)$$

$$P4:(x_4,y_4,z_4)$$

When it is assumed that the gravity point of the points P1 to P4 is P0, its spatial coordinates are expressed by the following Equation (5).

$$P0 : (x_0, y_0, z_0) = \left(\frac{x_1 + x_2 + x_3 + x_4}{4}, \frac{y_1 + y_2 + y_3 + y_4}{4}, \frac{z_1 + z_2 + z_3 + z_4}{4}\right) \quad (5)$$

Figure 12B:
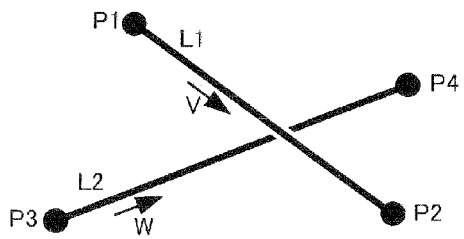

As shown in FIG. 12B, when it is assumed that a line in the space passing through the points P1 and P2 is L1 and a line in the space passing through the points P3 and P4 is L2, the lines L1 and L2 are expressed by the following Equations (6) and (7), respectively.

$$L1 : \frac{x - x_1}{x_1 - x_2} = \frac{y - y_1}{y_1 - y_2} = \frac{z - z_2}{z_1 - z_2} \quad (6)$$

$$L2 : \frac{x - x_3}{x_3 - x_4} = \frac{y - y_3}{y_3 - y_4} = \frac{z - z_3}{z_3 - z_4} \quad (7)$$

Figure 12C:
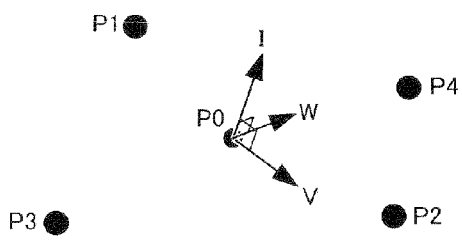

As shown in FIG. 12C, directional vectors V and W of the lines L1 and L2 are expressed by the following Equations (8) and (9), respectively.

$$V = (v_x, v_y, V_z) = (x_1 - x_2, y_1 - y_2, z_1 - z_2)$$

$$W = (W_x, W_y, W_z) = (x_3 - x_4, y_3 - y_4, z_3 - z_4) \quad (9)$$

Figure 12D:
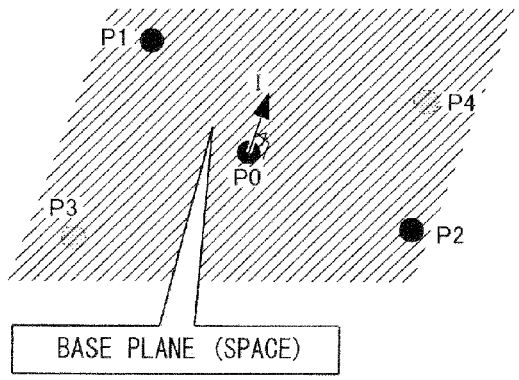

As shown in FIG. 12D, when a plane which passes through the gravity point P0 and whose normal vector is perpendicular to each of the directional vectors of the lines L1 and L2 is defined as a base plane, the equation of the base plane is obtained as follows. The base plane is defined by the following Equation (10).

$$Ax + By + Cz = 1 \quad (10)$$

Since the base plane passes through the gravitation point P0, the following Equation (11) can be obtained.

$$Ax_0 + By_0 + Cz_0 = 1 \quad (11)$$

Further, the normal vector I of the base plane is expressed by I=(A, B, C). Since the normal vector I of the base plane is perpendicular to each of the directional vectors V and W of the lines L1 and L2, the inner product between the directional vector V and the normal vector I becomes 0, and the inner product between the directional vector W and the normal vector I also becomes 0, as the following Equations (12) and (13).

$$AV_x + BV_y + CV_z = 0 \quad (12)$$

$$AW_x + BW_y + CW_z = 0 \quad (13)$$

The values of A, B, and C can be calculated using the Equations (11) to (13). By the above-described method, the base plane can be obtained.

Figure 13A:
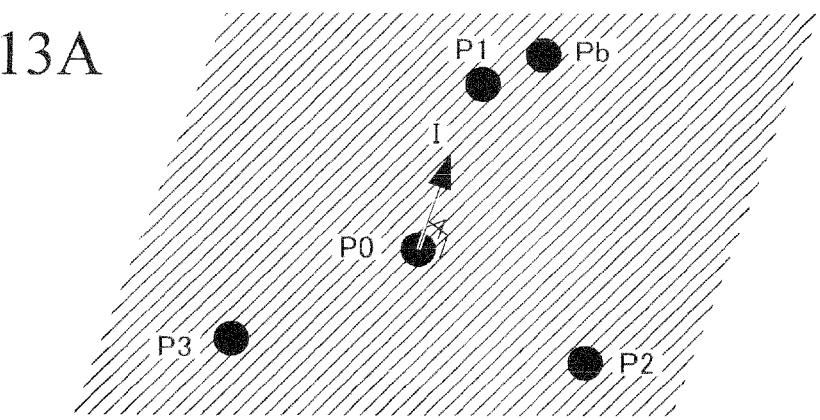
FIGS. 13A to 13C are reference diagrams showing a calculation method of a spatial distance according to the first embodiment of the present invention.

Next, the calculation method of the spatial distance (depth or height) in Step SC6 will be described with reference to FIGS. 13A to 13C. As shown in FIG. 13A, it is assumed that a spatial point which corresponds to the first base point is Pb, and its spatial coordinates are expressed as follows.

$$Pb : (x_b, y_b, z_b)$$

Figure 13B:
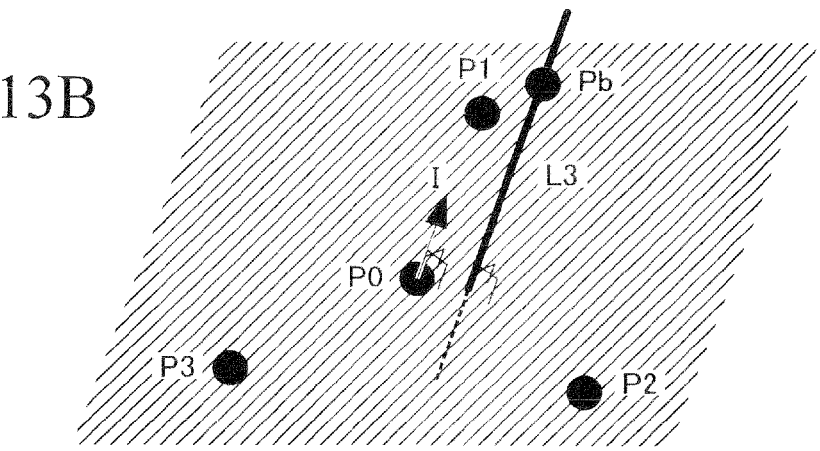

As shown in FIG. 13B, a spatial line L3 which passes through the spatial point Pb and whose directional vector is parallel to the normal vector I of the base plane is expressed by the following Equation (14).

$$L3 : \frac{x - x_b}{A} = \frac{y - y_b}{B} = \frac{z - z_b}{C} \quad (14)$$

Figure 13C:
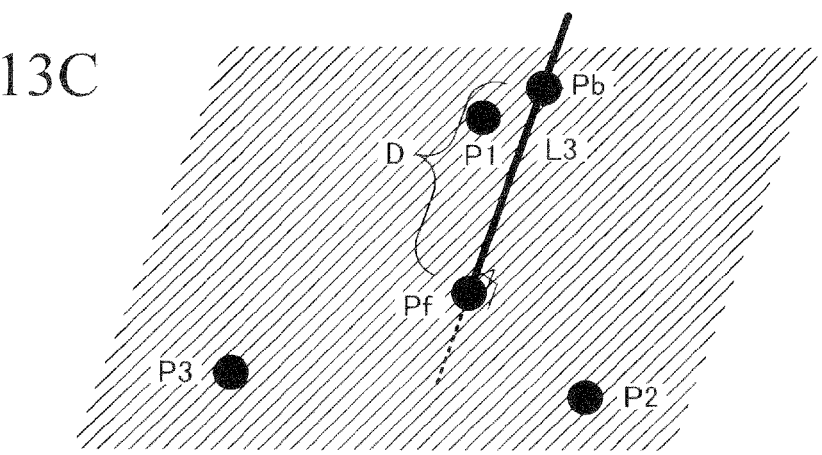

As shown in FIG. 13C, when it is assumed that an intersection point between the line L3 and the base plane is Pf, its spatial coordinates are expressed by the following Equation (15) using the Equations of the line L3 and the base plane. The intersection point Pf is the same as a foot of a perpendicular with respect to the base plane from the spatial point Pb.

$$P_f : \left(x_b - \frac{A(Ax_b + By_b + Cz_b - 1)}{A^2 + B^2 + C^2},\right. \quad (15)$$
$$\left. y_b - \frac{B(Ax_b + By_b + Cz_b - 1)}{A^2 + B^2 + C^2}, z_b - \frac{C(Ax_b + By_b + Cz_b - 1)}{A^2 + B^2 + C^2}\right)$$

Accordingly, the spatial distance D between the spatial point Pb and the intersection point Pf is equal to the distance between the spatial point Pb and the base plane. The spatial distance D is expressed by the following Equation (16).

$$D = \frac{|Ax_b + By_b + Cz_b - 1|}{\sqrt{A^2 + B^2 + C^2}} \quad (16)$$

When the spatial coordinates of the spatial point Pb is compared with the spatial coordinates of the intersection point Pf and the spatial point Pb is positioned further toward the positive side in the z-direction than the intersection point Pf, it is assumed that the spatial point Pb is at the position lower than the base plane (i.e., in the concave portion of the measurement target), and −D is regarded as a spatial distance (depth). On the other hand, when the spatial point Pb is positioned further toward the negative side in the z-direction than the intersection point Pf, it is assumed that the spatial point Pb is at the position higher than the base plane (i.e., in the convex portion of the measurement target), and +D is regarded as a spatial distance (height). By the above-described method, the spatial distance (depth or height) can be calculated. The calculation method of the spatial distance in the case in which the number of base plane composing points is four is the same as is described above.

Although the base plane is calculated by using the spatial coordinates of the three or four base plane composing points in the above-described methods, the base plane may be calculated by using spatial coordinates of five or more base plane composing points. Further, although the spatial distance is calculated based on the base plane in the above-described methods, the spatial distance between the gravity point P0 and the spatial point Pb may be regarded as a spatial distance which corresponds to the depth or height without obtaining the base plane.

In the present embodiment, the second base point is set after the first base point is set. However, the second base point may be set before the first base point is set. For example, in FIGS. 5A to 5D, the user may specify (fix) the second base point such that the second base point is located slightly outside the burned portion by performing an operation such as a click, and then, the user may move the cursor 500 and performs an operation such as a click to specify the first base point 510.

As described above, according to the present embodiment, when two points of the first base point and the second base point are set, a spatial distance between the base plane and a point in the space corresponding to the first base point can be calculated. Therefore, it is possible to reduce the burden of operation at the time of the plane-based measurement and improve the operability of the apparatus.

Further, the user can confirm the accuracy of the plane-based measurement by displaying the base circle and the base plane composing points. For example, the user can make a determination such that the user presumes that a certain level of accuracy can be obtained when the base circle and all of the base plane composing points surround the burned portion, and the user presumes that the accuracy degrades when a portion of the base circle passes outside the burned portion, or some of the base plane composing points are located outside the burned portion.

Further, in Step SB, until an operation of specifying (fixing) a second base point has been performed, the procedure does not proceed to the processing of calculating a base plane and a spatial distance, and the base circle and the base plane composing points on the measurement screen are updated in accordance with the movement of the cursor. As a result, it is possible to make the user confirm the base circle and the base plane composing points before performing measurement.

Second Embodiment

Next, a second embodiment of the present invention will be described. A configuration of an endoscope apparatus according to the present embodiment is the same as the configuration of the endoscope apparatus of the first embodiment. The present embodiment makes it possible to specify a second base point more flexibly.

Figure 14A:
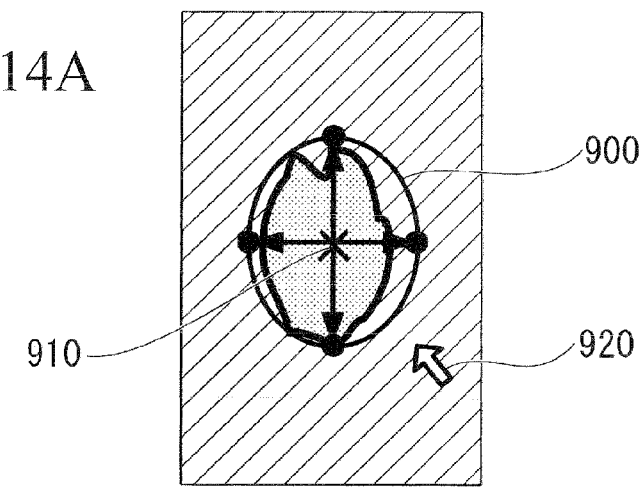
FIGS. 14A to 14C are reference diagrams showing a base ellipse, a base rectangle, and a base triangle, respectively, according to a second embodiment of the present invention.

Next is a description of the terms used in the present embodiment. The term "base ellipse" is an ellipse as shown in FIG. 14A that is set and displayed on the measurement screen when the user specifies a second base point. A base ellipse 900 has one diameter whose length is twice as long as the distance in the horizontal direction between a first base point 910 and a cursor 920, and the other diameter whose length is twice as long as the distance in the vertical direction between the first base point 910 and the cursor 920.

Figure 14B:
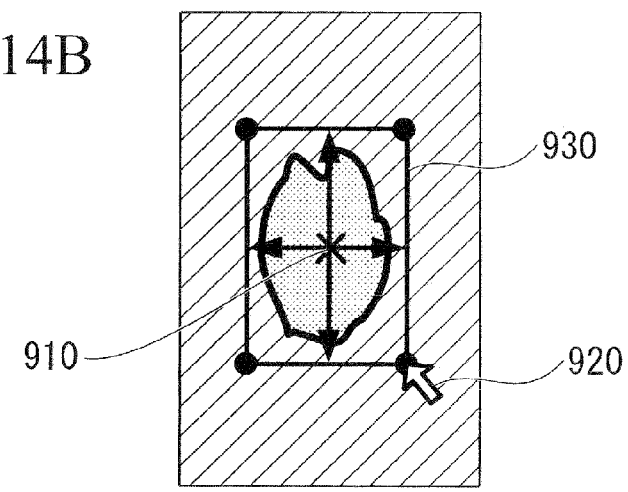

The term "base rectangle" is a rectangle as shown in FIG. 14B that is set and displayed on the measurement screen when the user specifies a second base point. A base rectangle 930 has one side whose length is twice as long as the distance in the horizontal direction between a first base point 910 and a cursor 920, and the other diameter whose length is twice as long as the distance in the vertical direction between the first base point 910 and the cursor 920.

Figure 14C:
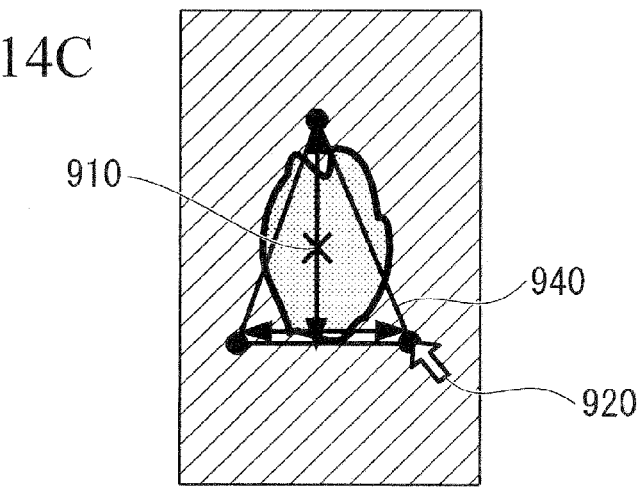

The term "base triangle" is a triangle as shown in FIG. 14C that is set and displayed on the measurement screen when the user specifies a second base point. A base triangle 940 has a base whose length is twice as long as the distance in the horizontal direction between a first base point 910 and a cursor 920, and a height which is twice as long as the distance in the vertical direction between the first base point 910 and the cursor 920.

Next, the method of specifying first and second base points will be described with reference to FIGS. 15A to 17C.

Figure 15A:
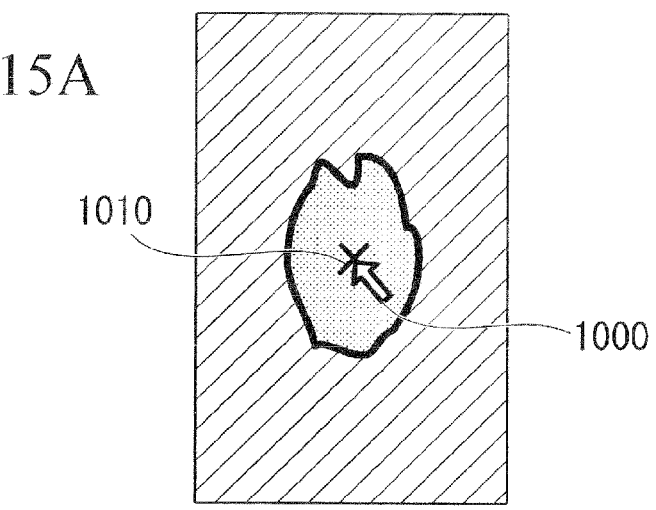
FIGS. 15A to 15C are reference diagrams showing a state in which a first base point and a second base point are specified according to the second embodiment of the present invention.
Figure 15B:
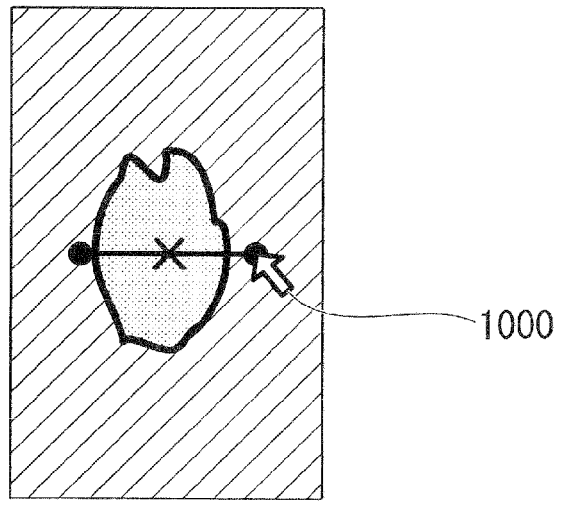
Figure 15C:
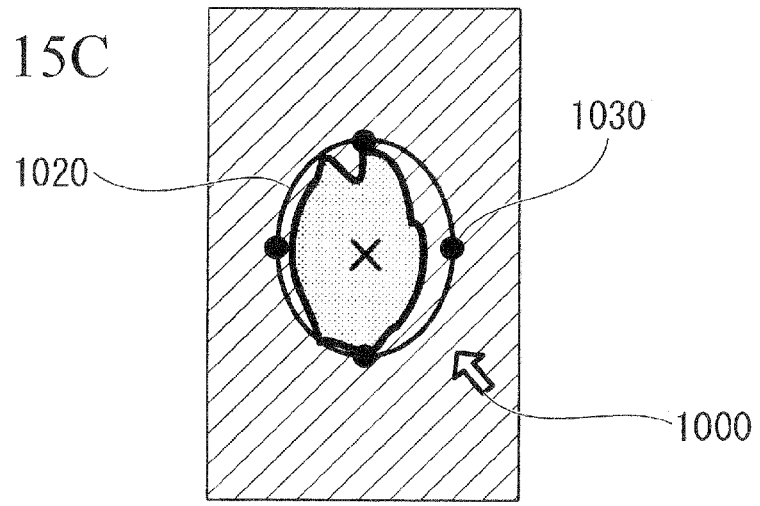

The method in the case of using the base ellipse is as follows. As shown in FIG. 15A, the user moves a cursor 1000 displayed on the left screen of the measurement screen and performs an operation such as a click to specify a first base point 1010. Then, as shown in FIGS. 15B and 15C, when the user moves the cursor 1000, a base ellipse 1020 and base plane composing points 1030 are displayed. At this time, a second base point is temporarily specified at the position of the cursor 1000.

The base ellipse 1020 has one diameter whose length is twice as long as the distance in the horizontal direction between the first base point 1010 and the cursor 1000, and the other diameter whose length is twice as long as the distance in the vertical direction between the first base point 1010 and the cursor 1000. The four base plane composing points 1030 are set on the base ellipse 1020 at the both edge points of the major and minor diameters. The user performs an operation such as a click to specify (fix) the second base point in a state where the four base plane composing points 1030 on the base ellipse 1020 are located slightly outside the burned portion (i.e., in a state where the base ellipse 1020 nearly surrounds the burned portion).

Figure 16A:
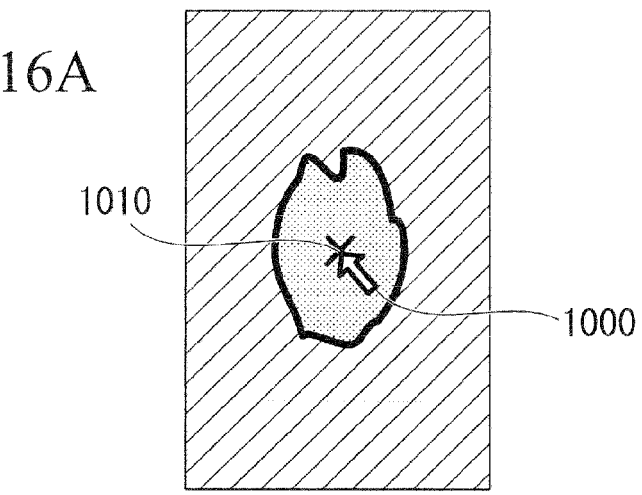
FIGS. 16A to 16C are reference diagrams showing a state in which a first base point and a second base point are specified according to the second embodiment of the present invention.
Figure 16B:
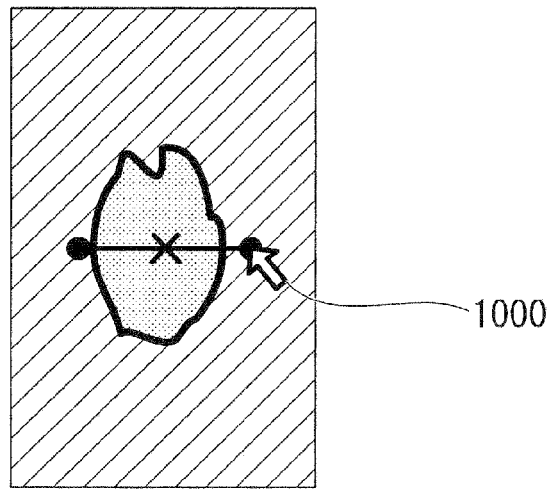
Figure 16C:
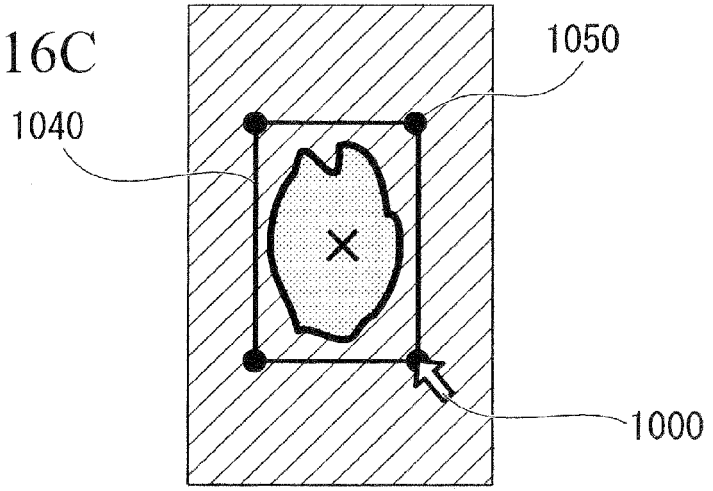

The method in the case of using the base rectangle is as follows. As shown in FIG. 16A, the user moves a cursor 1000 displayed on the left screen of the measurement screen and performs an operation such as a click to specify a first base point 1010. Then, as shown in FIGS. 16B and 16C, when the user moves the cursor 1000, a base rectangle 1040 and base plane composing points 1050 are displayed. At this time, a second base point is temporarily specified at the position of the cursor 1000.

The base rectangle 1040 has one side whose length is twice as long as the distance in the horizontal direction between the first base point 1010 and the cursor 1000, and the other side whose length is twice as long as the distance in the vertical direction between the first base point 1010 and the cursor 1000. The four base plane composing points 1050 are set at the corners of the base rectangle 1040. The user performs an operation such as a click to specify (fix) the second base point in a state where the four base plane composing points 1050 on the base rectangle 1040 are located slightly outside the burned portion (i.e., in a state where the base rectangle 1040 nearly surrounds the burned portion).

Figure 17A:
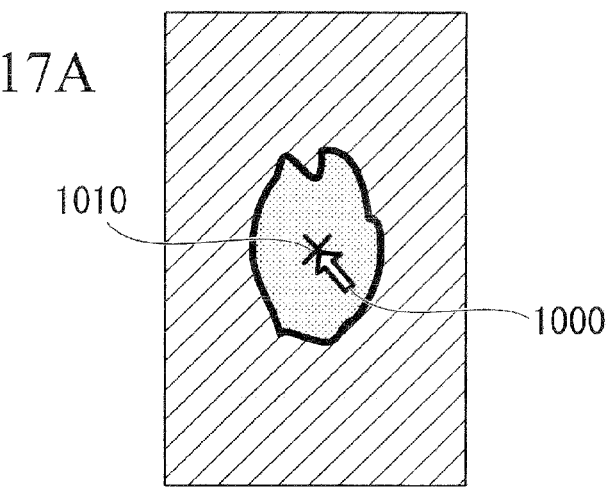
FIGS. 17A to 17C are reference diagrams showing a state in which a first base point and a second base point are specified according to the second embodiment of the present invention.
Figure 17B:
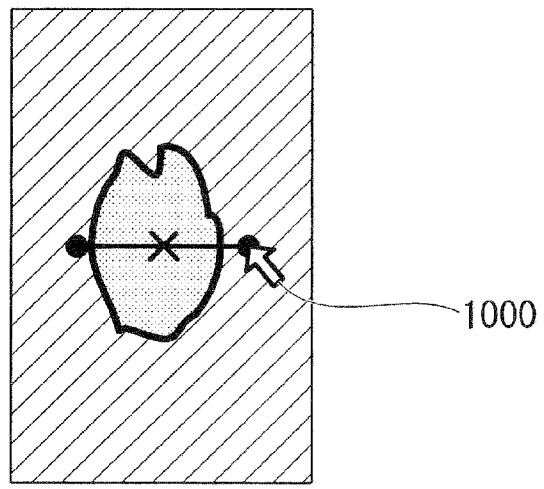
Figure 17C:
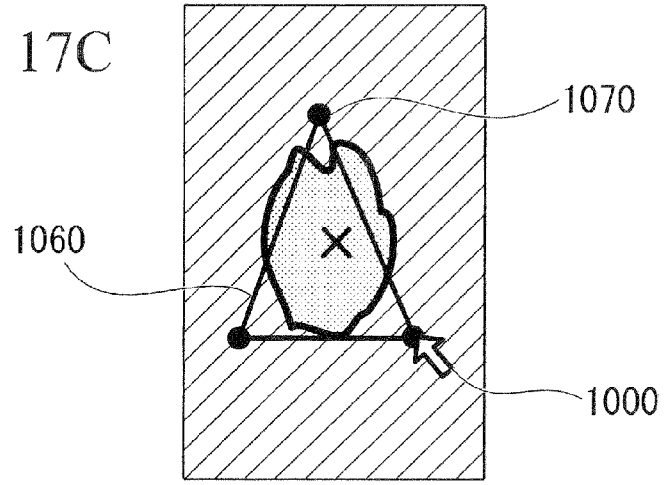

The method in the case of using the base triangle is as follows. As shown in FIG. 17A, the user moves a cursor 1000 displayed on the left screen of the measurement screen and performs an operation such as a click to specify a first base point 1010. Then, as shown in FIGS. 17B and 17C, when the user moves the cursor 1000, a base triangle 1060 and base plane composing points 1070 are displayed. At this time, a second base point is temporarily specified at the position of the cursor 1000.

The base triangle 1060 has a base whose length is twice as long as the distance in the horizontal direction between the first base point 1010 and the cursor 1000, and a height which is twice as long as the distance in the vertical direction between the first base point 1010 and the cursor 1000. The three base plane composing points 1070 are set on the base triangle 1060 at the two edge points of the base and at the apex. The user performs an operation such as a click to specify (fix) the second base point in a state where the three base plane composing points 1050 on the base triangle 1060 are located slightly outside the burned portion.

As described above, according to the present embodiment, it is possible to flexibly set a base line (i.e., base ellipse, base rectangle, or base triangle) with various shapes and sizes. Further, it is possible to obtain the following effects.

Figure 18:
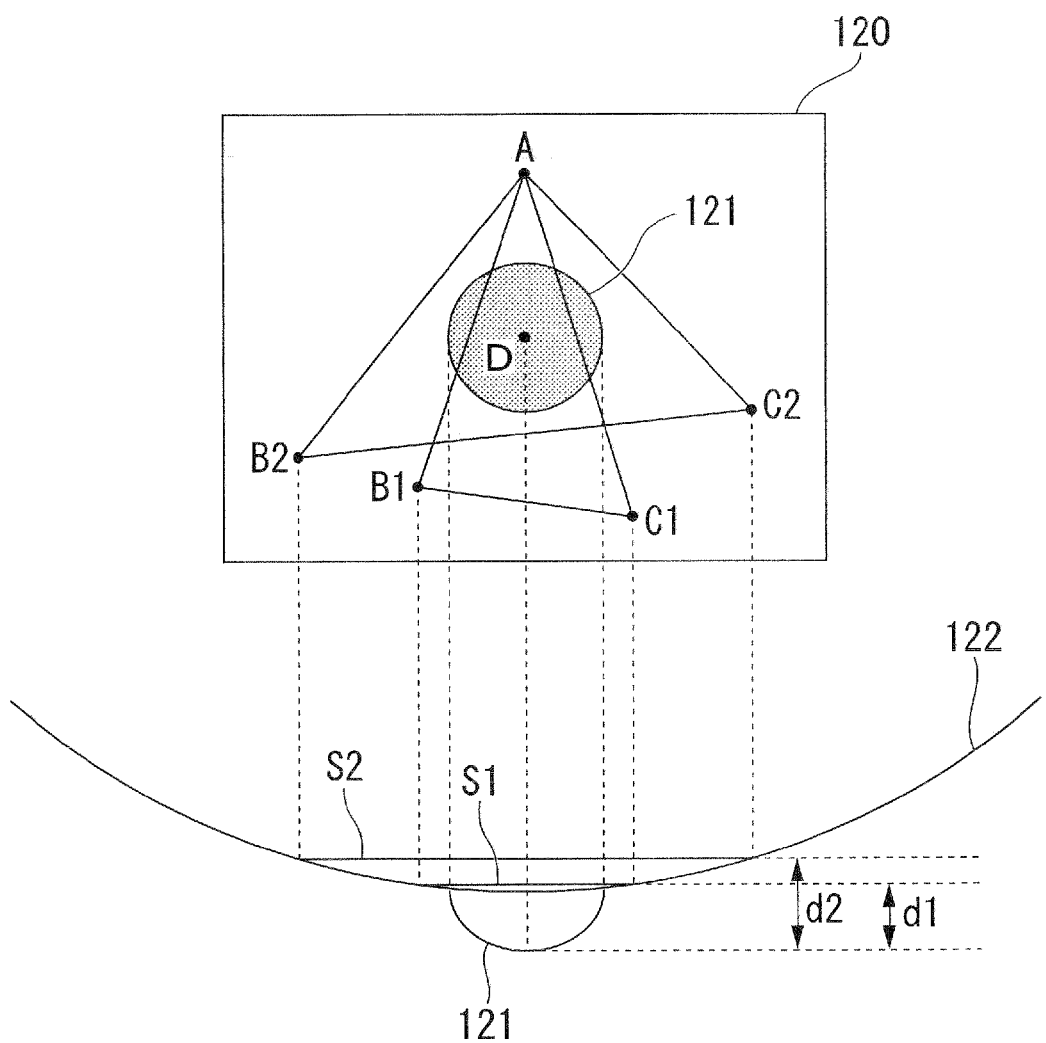
FIG. 18 is a reference diagram for explaining effects according to the second embodiment of the present invention.

As shown in FIG. 18, the case in which a concave portion 121 as a measurement target exists on an image 120 obtained by capturing the surface of the measurement target will be illustrated. The lower portion in FIG. 18 shows a cross-sectional surface of the measurement target. As described above, the first base point which specifies the position at which the depth of the concave portion 121 is measured, and the base plane composing points which determine a base line approximating a surface 122 of the measurement target are set in accordance with the user's operation.

For example, when points A, B1, and C1 are set as base plane composing points and a point D is set as a first base point, the depth of the concave portion 121 becomes d1. On the other hand, when points A, B2, and C2 are specified as base plane composing points and the point D is set as a first base point, the depth of the concave portion 121 becomes d2.

When the points A, B1, and C1 are set as base plane composing points, a base plane S1 passing through these points approximates the surface 122 inside a pipe with relatively high accuracy. Therefore, an error of the depth d1 as the measurement result with respect to the actual depth is small. However, when the points A, B2, and C2 are set as base plane composing points, the degree of approximation of a base plane S2 passing through these points with respect to the surface 122 inside the pipe is low compared with the base plane S1. Therefore, an error of the depth d2 as the measurement result with respect to the actual depth becomes large.

As described above, errors in the measurement result may occur due to the position of the base plane composing points. Therefore, it is desirable that the base plane composing points are set in the positions where errors in the measurement result becomes small. In the present embodiment, the base line can be flexibly set by using a base ellipse, a base rectangle, or a base triangle in accordance with the shape and the size of the burned portion. Therefore, it is possible to reduce errors in the measurement result.

Third Embodiment

Next, a third embodiment of the present invention will be described. A configuration of an endoscope apparatus according to the present embodiment is the same as the configuration of the endoscope apparatus of the first embodiment. The present embodiment makes it possible to preliminarily notify the user of a guide of measurement accuracy. The measurement accuracy depends on the object distance which is a distance from the distal end of the endoscope 2 to the measurement target. It is possible to have some awareness of the level of measurement accuracy by calculating the object distance. Generally, the smaller the object distance is, the better the measurement accuracy is.

Figure 19:
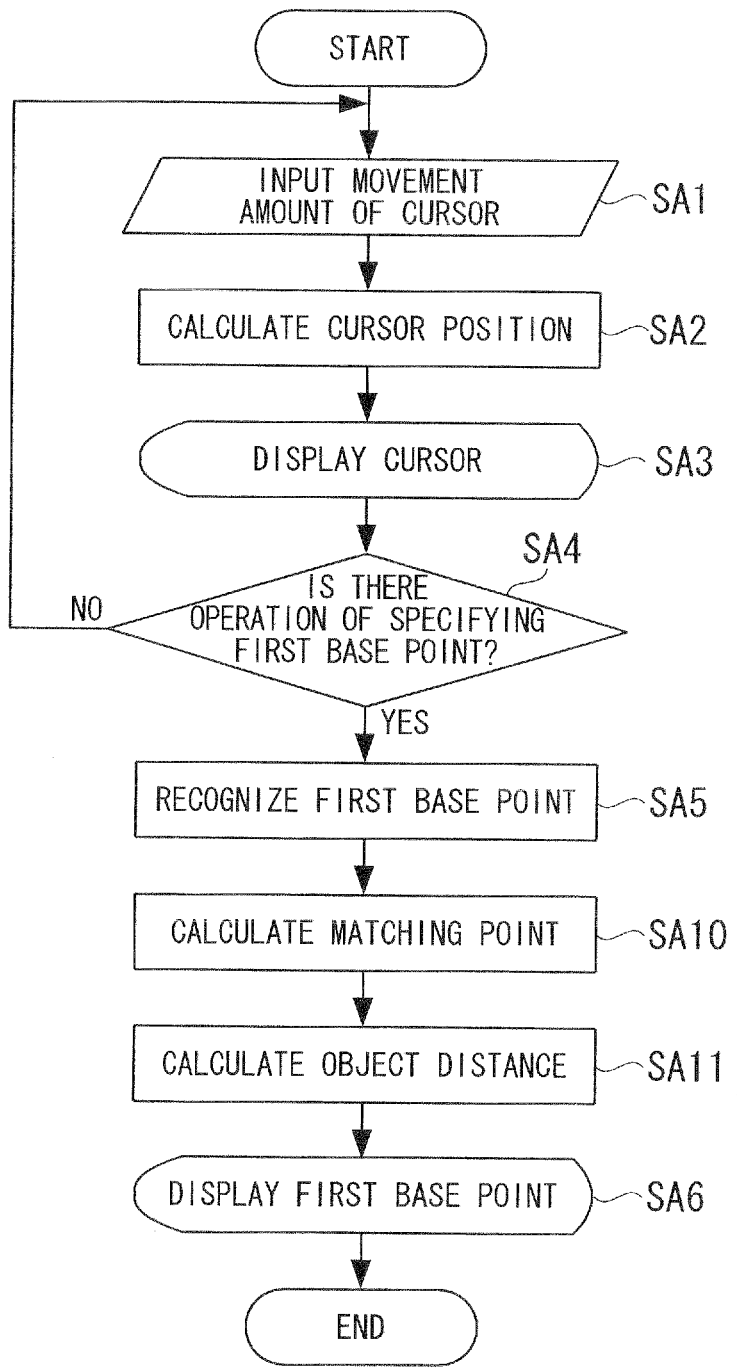
FIG. 19 is a flow chart showing a procedure of measurement according to a third embodiment of the present invention.

Hereinafter, an explanation will be made only a different point from the first embodiment. The measurement of the present embodiment is different from the first embodiment in the processing of Steps SA and SB in FIG. 4. FIG. 19 shows a procedure of Step SA. The procedure shown in FIG. 19 is different from the procedure shown in FIG. 8 in that Steps SA10 and SA11 are inserted between Steps SA5 and SA6.

In Step SA10, the point calculation section 18d calculates image coordinates of a corresponding point (matching point) on the right image which correspond to the image coordinates of the first base point on the left image by the matching processing. In Step SA11, the spatial-coordinate calculation section 18e calculates spatial coordinates of a point in the space corresponding to the first base point based on the image coordinates of the first base point and the image coordinates of its matching point. The z-coordinate of the spatial coordinates is the object distance.

In Step SA6, the control section 18a generates a graphic image signal for displaying the first base point at the calculated image coordinates, and outputs it to the video signal processing circuit 12. At this time, the control section 18a sets the color of the first base point in accordance with its object distance. As a result, the first base point is displayed in the color in accordance with its object distance at the same position as the cursor.

Figure 20:
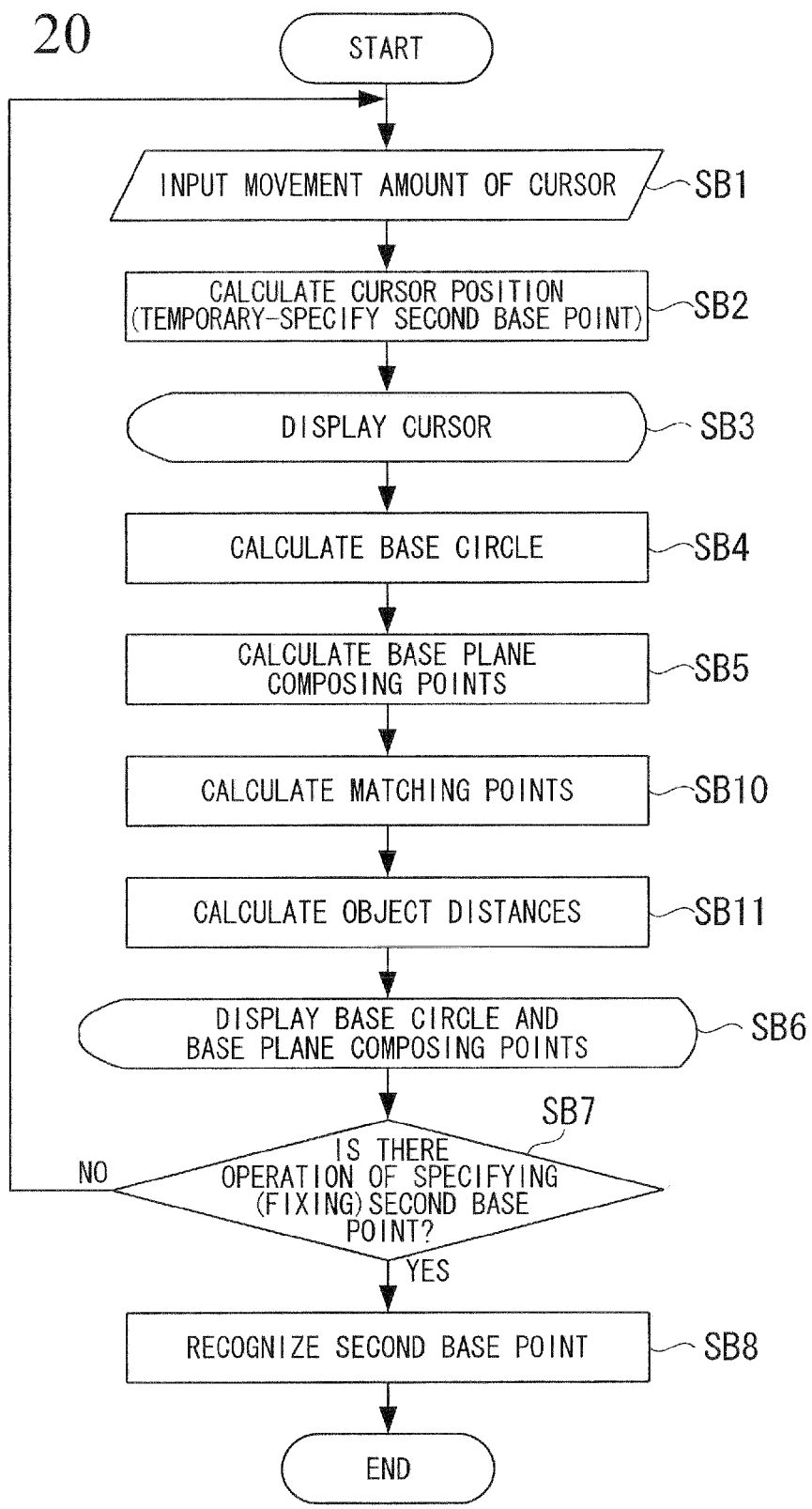
FIG. 20 is a flow chart showing a procedure of measurement according to the third embodiment of the present invention.

FIG. 20 shows a procedure of Step SB. The procedure shown in FIG. 20 is different from the procedure shown in FIG. 9 in that Steps SB10 and SB11 are inserted between Steps SB5 and SB6. In Step SB10, the point calculation section 18d calculates image coordinates of three or four corresponding points (matching points) on the right image which correspond to the image coordinates of the three or four base plane composing points on the left image by the matching processing. In Step SB11, the spatial-coordinate calculation section 18e calculates spatial coordinates of points in the space which correspond to the base plane composing points based on the image coordinates of the base plane composing points and the image coordinates of their matching points. The z-coordinate of the spatial coordinates is the object distance.

In Step SB6, the control section 18a generates a graphic image signal for displaying the base circle and the base plane composing points, and outputs it to the video signal processing circuit 12. At this time, the control section 18a sets the colors of the base plane composing points in accordance with their respective object distances. As a result, the base circle is displayed and the base plane composing points are displayed in the color in accordance with their respective object distances.

Figure 21A:
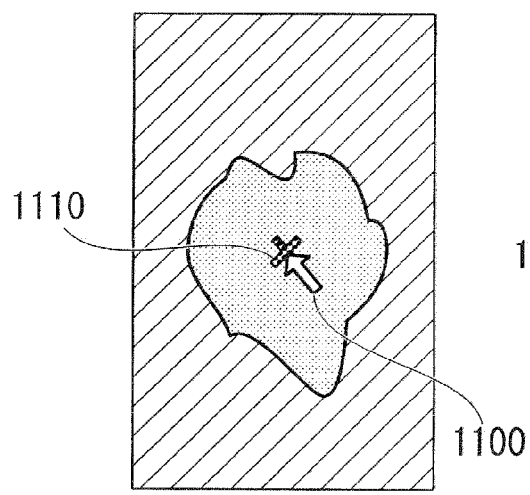
FIGS. 21A to 21D are reference diagrams showing a state in which a first base point and a second base point are specified according to the third embodiment of the present invention.
Figure 21B:
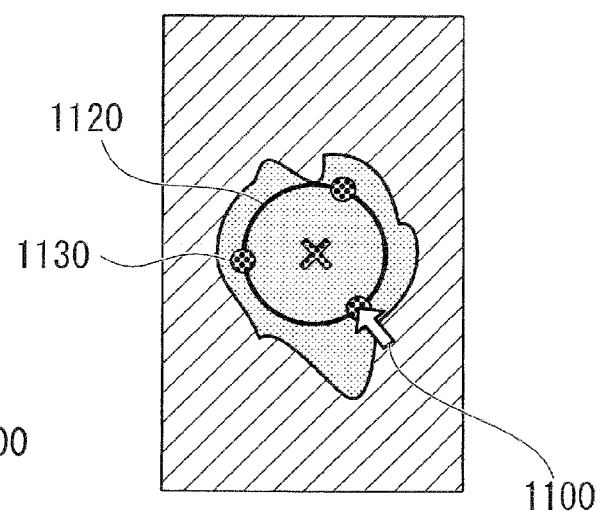

FIGS. 21A to 21D shows a state in which first and second base points are specified. As shown in FIG. 21A, the user moves a cursor 1100 displayed on the left screen of the measurement screen and performs an operation such as a click to specify a first base point 1110. At this time, the first base point 1110 is displayed in the color in accordance with its object distance. As shown in FIG. 21B, when the user moves the cursor 1100, a base circle 1120 is displayed and three base plane composing points 1130 are displayed on the base circle 1120. At this time, a second base point is temporarily specified at the position of the cursor 1100. Further, the base plane composing points 1130 are displayed in the color in accordance with their respective object distances.

Figure 21C:
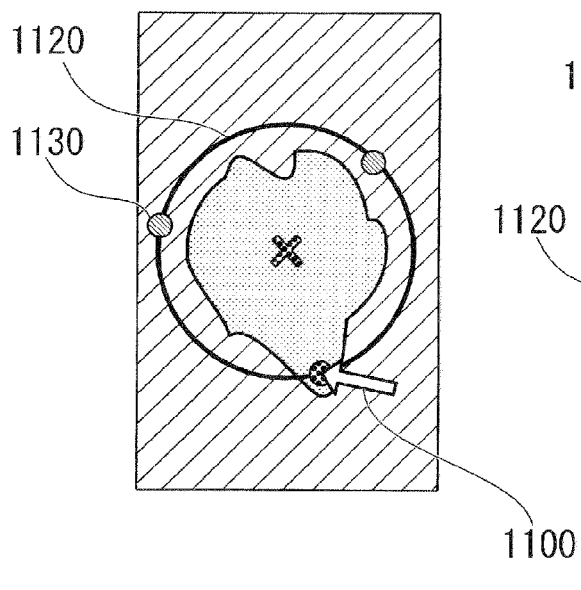
Figure 21D:
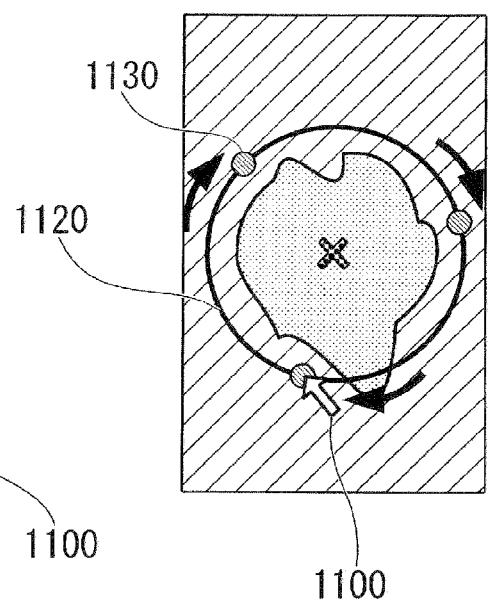

As shown in FIGS. 21C and 21D, when the user further moves the cursor 1100, the position of the temporarily-specified second base point changes in accordance with the movement of the cursor 1100, and the base circle 1120 and the base plane composing points 1130 also change. At this time, the base plane composing points 1130 are displayed in the color in accordance with their respective object distances. Then, the user performs an operation such as a click to specify (fix) the second base point in a state where the base circle 1120 is located slightly outside the burned portion (i.e., in a state where the base circle 1120 nearly surrounds the burned portion).

The user can know the object distances from the colors of the first base point and the base plane composing points, and use the object distances as a guide of measurement accuracy. In the above-described embodiment, the colors of the first base point and the base plane composing points are changed in accordance with their respective object distances. However, other display configurations such as the size may be changed. Further, the object distance of the second base point may be calculated and the second base point may be displayed in the color in accordance with the object distance.

In Step SA11 or Step SB11, the control section 18a may determines whether or not each of the object distances is equal to or less than a predetermined value, and the specification (fixation) of the first base point or the second base point may be prohibited when there is an object distance which exceeds the predetermined value. That is, the first base point or the second base point may be specified (fixed) only when each of the object distances is equal to or less than a predetermined value. In this case, the processing proceeds to Step SC only when all of the object distances become equal to or less than the predetermined value. Further, a warning for the user which indicates that there is a possibility that the base plane is not appropriately set may be displayed when the variability of the object distances of the base plane composing points calculated in Step SB11 is remarkable.

As described above, according to the present embodiment, it is possible for the user to confirm the measurement accuracy using the object distance when specifying the first base point and the second base point. As a result, it is possible to reduce measurement error in cases where a base plane is set at the position unsuitable for measurement. Further, by prohibiting the processing from proceeding to the calculation of the base plane and the spatial distance in Step SC until the object distances become equal to or less than a predetermined value, it is possible to reduce measurement error in cases where a base plane is set at the position unsuitable for measurement.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An endoscope apparatus, comprising:
an imaging unit that acquires an image of a subject;
a display that displays the image;
a base point setting section that sets a first base point and a second base point on the image based on an instruction input via an input device;
a base line setting section that sets a base line on the image based on the first base point and the second base point, such that the base line completely surrounds the first base point and does not include the first base point;
a point setting section that sets at least three points on the image based on the base line, wherein the at least three points are on the base line and do not include the first base point;
a corresponding point setting section that sets, after positions of the first base point and the second base point are fixed on the image, a corresponding point in space that corresponds to the first base point set on the image;
a base plane setting section that sets, after the positions of the first base point and the second base point are fixed on the image, a base plane in space based on the at least three points set on the image; and
a distance calculation section that (i) identifies an intersection point where a line intersects the base plane set in space, said line being normal to the base plane set in space and passing through the corresponding point in space, and (ii) calculates a spatial distance between the intersection point on the base plane set in space and the corresponding point set in space that corresponds to the first base point.

2. The endoscope apparatus according to claim 1, wherein the display further displays at least one of the base line and the at least three points.

3. The endoscope apparatus according to claim 2, wherein:
the display further displays a cursor;
after the first base point is fixed based on an instruction input via the input device, the base point setting section detects a position of the cursor based on an instruction input via the input device and sets the second base point based on the position of the cursor; and
the at least one of the base line and the at least three points displayed by the display are updated in accordance with movement of the cursor.

4. The endoscope apparatus according to claim 1, further comprising an object distance calculation section which calculates an object distance based on at least one of the first base point, the second base point, and the at least three points.

5. The endoscope apparatus according to claim 4, wherein the base plane setting section sets the base plane when the object distance is equal to or less than a predetermined value.

6. The endoscope apparatus according to claim 4, wherein the distance calculation section calculates the distance when the object distance is equal to or less than a predetermined value.

7. The endoscope apparatus according to claim 5, wherein the display further displays the object distance.

8. The endoscope apparatus according to claim 6, wherein the display further displays the object distance.

9. A measurement method comprising:
acquiring an image of a subject;
setting a first base point and a second base point on the image based on an instruction input via an input device;
setting a base line on the image based on the first base point and the second base point, such that the base line completely surrounds the first base point and does not include the first base point;
setting at least three points on the image based on the base line, wherein the at least three points do not include the first base point;
after positions of the first base point and the second base point are fixed on the image, setting a corresponding point in space that corresponds to the first base point set on the image;
after the positions of the first base point and the second base point are fixed on the image, setting a base plane in space based on the at least three points set on the image;
identifying an intersection point where a line intersects the base plane set in space, said line being normal to the base plane set in space and passing through the corresponding point in space; and
calculating a spatial distance between the intersection point on the base plane set in space and the corresponding point set in space that corresponds to the first base point.

* * * * *